(12) United States Patent
Filippov et al.

(10) Patent No.: US 10,104,379 B2
(45) Date of Patent: Oct. 16, 2018

(54) METHODS AND APPARATUS FOR DATA HIDING IN MULTI-LAYER STRUCTURED CODING UNITS

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 15/282,726

(22) Filed: Sep. 30, 2016

(65) Prior Publication Data

US 2017/0048528 A1     Feb. 16, 2017

Related U.S. Application Data

(63) Continuation of application No. PCT/RU2014/000236, filed on Apr. 1, 2014.

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/102* (2014.11); *H04N 19/105* (2014.11);
(Continued)

(58) Field of Classification Search
CPC .... H04N 19/176; H04N 19/70; H04N 19/102; H04N 19/18; H04N 19/174;
(Continued)

(56) References Cited

U.S. PATENT DOCUMENTS 6,456,726 B1 *  9/2002  Yu .................... G06T 1/0021
                                                      348/463
6,553,070 B2 *  4/2003  Hashimoto ........... G06T 1/0035
                                                     375/240.18
(Continued)

FOREIGN PATENT DOCUMENTS

CN       101621692 A      1/2010
CN       102025997 A      4/2011
(Continued)

OTHER PUBLICATIONS

Zhang et al., "Additional Sign Bit Hiding of Transform Coefficients in HEVC," 2013 IEEE International Conference on Multimedia and Expo Workshops (ICMEW), XP032494526, Institute of Electrical and Electronics Engineer, New York, New York (Jul. 15-19, 2013).
(Continued)

*Primary Examiner* — Neil R Mikeska
(74) *Attorney, Agent, or Firm* — Leydig, Voit & Mayer, Ltd.

(57) ABSTRACT

The Embodiments of the invention relate to methods for hiding values of a hierarchically layered coding unit in other values comprised by the coding unit is provided. Furthermore, embodiments of the invention also relate to methods for reconstructing hidden data from an encoded coding unit. Embodiments of the invention are also related to the implementation of these encoding and decoding methods in an apparatus and on a non-transitory computer readable medium. According to the embodiments of the invention, data are hidden in values of different layers of a hierarchically structured coding unit.

30 Claims, 15 Drawing Sheets

US 10,104,379 B2
Page 2

(51) Int. Cl.
*H04N 19/117* (2014.01)
*H04N 19/102* (2014.01)
*H04N 19/174* (2014.01)
*H04N 19/18* (2014.01)
*H04N 19/187* (2014.01)
*H04N 19/467* (2014.01)
*H04N 19/61* (2014.01)
*H04N 19/70* (2014.01)
*H04N 19/176* (2014.01)
*H04N 19/182* (2014.01)

(52) U.S. Cl.
CPC ......... *H04N 19/117* (2014.11); *H04N 19/174* (2014.11); *H04N 19/176* (2014.11); *H04N 19/18* (2014.11); *H04N 19/187* (2014.11); *H04N 19/467* (2014.11); *H04N 19/61* (2014.11); *H04N 19/70* (2014.11); *H04N 19/182* (2014.11)

(58) Field of Classification Search
CPC .. H04N 19/467; H04N 19/159; H04N 19/117; H04N 19/105; H04N 19/187; H04N 19/61

See application file for complete search history.

(56) References Cited

U.S. PATENT DOCUMENTS

| | | | |
|---|---|---|---|
| 2001/0009581 A1* | 7/2001 | Hashimoto | G06T 1/0028 380/205 |
| 2003/0177359 A1* | 9/2003 | Bradley | G06T 1/0064 713/172 |
| 2004/0208339 A1* | 10/2004 | Abe | G06T 1/0028 382/100 |
| 2013/0188725 A1 | 7/2013 | Wang et al. | |
| 2013/0272424 A1 | 10/2013 | Sole Rojals et al. | |
| 2014/0003533 A1 | 1/2014 | He et al. | |
| 2014/0314144 A1* | 10/2014 | Henry | H04N 19/176 375/240.02 |
| 2015/0139303 A1 | 5/2015 | Sato | |

FOREIGN PATENT DOCUMENTS

| | | |
|---|---|---|
| CN | 102685500 A | 9/2012 |
| CN | 103220515 A | 7/2013 |
| EP | 0851391 B1 | 3/2003 |
| EP | 1628257 A1 | 2/2006 |
| EP | 2618572 A1 | 7/2013 |
| EP | 2637409 A1 | 9/2013 |
| EP | 2675159 A1 | 12/2013 |
| EP | 3094094 B1 | 3/2018 |
| WO | 2013068684 A1 | 5/2013 |
| WO | 2014002896 A1 | 1/2014 |

OTHER PUBLICATIONS

Tirkel et al., "Electronic Water Mark," https://www.researchgate.net/publication/242366084, ResearchGate, (Uploaded May 15, 2017).
Wang et al. "Multiple Sign Bits Hiding for High Efficiency Video Coding," 2012 IEEE Visual Communications and Image Processing (VCIP), Institute of Electrical and Electronics Engineers, New York, New York (Nov. 2012).
Sullivan et al., "Overview of the High Efficiency Video Coding (HEVC) Standard," IEEE Transactions on Circuits and Systems for Video Technology, vol. 22, No. 12, pp. 1649-1668, Institute of Electrical and Electronic Engineers, New York, New York (Dec. 2012).
"Series H: Audiovisual and Multimedia Systems; Infrastructure of audiovisual services—Coding of moving video; Advanced video coding for generic audiovisual services," Recommendation ITU-T H.264, Telecommunication Standardization Sector of ITU, Geneva, Switzerland (Apr. 2013).
"Series H: Audiovisual and Multimedia Systems; Infrastructure of audiovisual services—Coding of moving video; High efficiency video coding," Recommendation ITU-T H.265, Telecommunication Standardization Sector of ITU, Geneva, Switzerland (Apr. 2013).
Bjontegaard et al. "Improvements of the BD-PSNR model," ITU-T Telecommunications Standardization Sector Study Group 16 Questions 6, Video Coding Experts Group (VCEG), 35th Meeting, Document VCEG-AI11, Filename: VCEG-AI11.doc, Berlin, Germany (Jul. 16-18, 2008).
Dong, "Crosscheck for JCTVC-G358 new modes for chroma intra prediction," Joint Collaborative Team on Video coding (JCT-VC) of ITU-T SG16 WP3 and ISO/IEC JTC1/SC29/WG11, 7th Meeting, JCTVC-G273, Geneva, Switzerland (Nov. 21-30, 2011).
Bossen, "Common test conditions and software reference configurations," Joint Collaborative Team on Video Coding (JCT-VC) of ITU-T SG16 WP3 and ISO/IES JTC1/SC29/WG11, 12th Meeting, JCTVC-L1100, Geneva Switzerland, (Jan. 14-23, 2013).
Clare et al., "Sign Data Hiding," Joint Collaborative Team on Video Coding (JCT-VC) of ITU-T SG16 WP3 and ISO/IEC JTC1/SC29/WG11, 7th Meeting, JCTVC-G271, Geneva, Switzerland (Nov. 21-30, 2011).
Yu et al., "Simplification of Multiple Sign Bit Hiding," Joint Collaborative Team on Video Coding (JCT-VC) of ITU-T SG 16 WP 3 and ISO/IEC JTC 1/SC 29/WG 11, 9th Meeting, JCTVC-I0156, Geneva, Switzerland (Apr. 27-May 7, 2012).
Wang et al., "Multiple Sign Bits Hiding for High Eficiency Video Coding," 2012 IEEE Visual Communications and Image Processing (VCIP), XP032309167, Institute of Electrical and Electronics Engineers, New York, New York, (Nov. 27-30, 2012).
Ikai et al., "Simplified decision for sign hiding," Joint Collaborative Team on Video Coding (JCT-VC) of ITU-T SG 16 WP3 and ISO/IEC JTC 1/SC 29/WG 11, 9th Meeting, JCTVC-I0291, JCTVC-Ixxxx, Geneva, Switzerland, (Apr. 27-May 7, 2012).
Sole et al., "Sign data hiding simplification and enhancement," Joint Collaborative Team on Video Coding (JCT-VC) of ITU-T SG 16 WP3 and ISO/IEC JTC 1/SC 29/WG 11 9th Meeting, JCTVC-I0326, Geneva, Switzerland (Apr. 27- May 7, 2012).
Wang et al. "Simplification of multiple sign bit hiding criterion," Joint Collaborative Team on Video Coding (JCT-VC) of ITU-T SG 16 WP 3 and ISO/IEC JTC 1/SC 29/WG 11, JCTVC-J0094 10th Meeting, Stockholm, Sweden, (Jul. 11-20, 2012).
Thiesse et al., "Rate Distortion Data Hiding of Motion Vector Competition Information in Chroma and Luma Samples for Video Compressions," IEEE Transactions on Circuits and Systems for Video Technology vol. 21, No. 6, pp. 729-741, XP011480312, Institute of Electrical and Elecronics Engineers, New York, New York (Jun. 2011).
Fu et al., "Sample Adaptive Offset in the HEVC Standard," IEEE Transactions on Circuits and Systems for Video Technology vol. 22, No. 12, pp. 1755-1764, XP011487153, Institute of Electrical and Electronics Engineers, New York, New York (Dec. 2012).
Hadar et al., "Rate distortion optimization for efficient watermarking in the DCT domain," 2008 IEEE International Symposium on Broadband Multimedia Systems and Broadcasting, XP031268612, Institute of Electrical and Electronics Engineers, New York, New York, (Mar. 31-Apr. 2, 2008).
Thiesse et al., "Data Hiding of Intra Prediction Information in Chroma Samples for Video Compression," Proceedings of 2010 IEEE 17th International Conference on Image Processing, pp. 2861-2864, XP031813491, Institute of Electrical and Electronics Engineers, New York New York (Sep. 26-29, 2010).
Thiesse et al., "Data hiding of Motion Information in Chroma and Luma Samples for Video Compression," 2010 IEEE International Workshop on Multimedia Signal Processing (MMSP), XP031830585, pp. 217-221, Institute of Electrical and Electronic Engineers, New York, New York (Oct. 4-6, 2010).
Silcock et al., "Extension of HM7 to Support Additional Chroma Formats," Joint Collaborative Team on Video coding (JCT-VC) of ITU-T SG 16 WP 3 and ISO/IEC JTC 1/SC 29/WG 11, 10th Meeting, JCTVC-J0191 XP030112553, Stockholm, Sweden (Jul. 11-20, 2012).
Yu et al., "Multiple Sign Bits Hiding," Joint Collaborative Team on Video Coding (JCT-VC) of ITU-T SG16 WP3 and ISO/IEC JTC1/

(56) References Cited

OTHER PUBLICATIONS

SC29/WG11, 8th Meeting, JCTVC-H0481, XP0301115082, San Jose, CA, USA (Feb. 1-10, 2012).

* cited by examiner

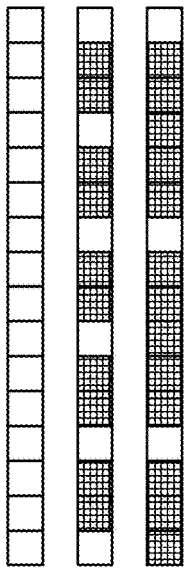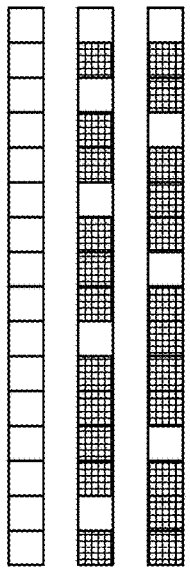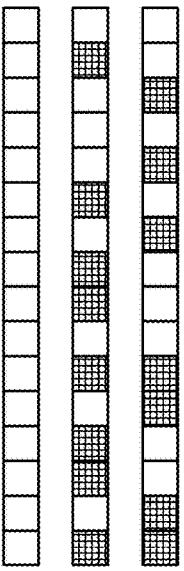

METHODS AND APPARATUS FOR DATA HIDING IN MULTI-LAYER STRUCTURED CODING UNITS

CROSS-REFERENCE TO RELATED APPLICATIONS

This application is a continuation of International Application No. PCT/RU2014/000236, filed on Apr. 1, 2014, the disclosure of which is hereby incorporated by reference in its entirety.

FIELD OF INVENTION

The embodiments of the invention relates to methods for hiding values of a hierarchically layered coding unit in other values comprised by the coding unit is provided (encoding methods). Furthermore, embodiments of the invention also relates to methods for reconstructing hidden data from an encoded coding unit (decoding method). Embodiments of the invention are also related to the implementation of these encoding and/or decoding methods in an apparatus and on a (non-transitory) computer readable medium.

TECHNICAL BACKGROUND

Lossy data compression has numerous applications, especially in communications, broadcasting, entertainment, and security. Video compression is a challenging task, because large compression ratios are required to transmit high-quality and high-resolution pictures over existing communication channels. This task is even more challenging in the context of wireless and mobile communications, or real-time encoding of media.

The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/HEVC standard is given in the article by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly to the ITU-T H.264/AVC video coding standard, the HEVC/H.265 video coding standard provides for a division of the source picture into blocks, e.g. coding units (CUs). Each of the CUs could be further split into either smaller CUs or prediction units (PUs). A PU could be intra- or inter-predicted according to the type of processing applied for the pixels of PU. In case of inter-prediction, a PU represents an area of pixels that is processed by motion compensation using a motion vector specified for a PU. For intra prediction PU specifies prediction mode for a set of transform units (TUs). A TU can have different sizes (e.g., 4×4, 8×8, 16×16 and 32×32 pixels) and could be processed in different ways. For a TU transform coding is being performed, i.e. the prediction error is being transformed with a discrete cosine transform (DCT) and quantized. Resulting quantized transform coefficients are grouped into CGs, each CG having 16 quantized transform coefficients.

As noted above, the core tools of these standards or similar proprietary codecs to encode the blocks of picture are inter- and intra-prediction, spectrum-transformation (e.g., discrete cosine transform or its integer approximation) and quantization. Inter- and intra-prediction tools are used to generate a prediction signal for a given block. At the encoder side, the difference between a source block and its prediction, the so-called residual signal, is transformed into their spectrum, i.e. source block pixels are represented by transform coefficients in frequency domain. Further, the coefficients are quantized. Non-zero and zero quantized transform coefficients are often referred to as significant and insignificant coefficients, respectively. All syntax elements including quantized transform coefficients and side information (e.g., intra prediction modes for intra-coding and motion vectors for inter-coding) are binarized and entropy encoded. The part of entropy encoded coefficients in a compressed H.265/HEVC bit-stream may exceed 80%.

The stages of encoding quantized transform coefficients are as follows:
  Encoding the position of last significant coefficient, i.e. the last non-zero quantized transform coefficient.
  Encoding the significance map that is used to restore positions of all the non-zero coefficients.
  Sign encoding of the significant coefficients.
  Magnitude encoding of the significant coefficients.

These stages are performed in the context of quantized transform coefficients being split into so-called coefficient groups (CGs). Each CG is a subset that typically consists of 4×4 coefficients.

Explicit sign encoding requires one sign bit per one significant coefficient to be encoded. However, a new tool referred to as Sign Bit Hiding (SBH) has been adopted for the ITU-T H.265/HEVC standard. The basic idea behind this technique is to implicitly indicate the sign of the first significant coefficient within a given CG using a parity check of the sum of least significant bits of the significant coefficients belonging to that CG. This tool is applied not to all the CGs but just to those CGs that meet the threshold condition, i.e. the difference of positions of the first and last significant coefficients should be more or equal to four. According to the results presented by the Joint Collaborative Team on Video Coding (JCT-VC) that was responsible for developing the H.265/HEVC standard, this tool reduces the bit-rate for the same quality for a wide range of video sequences used in JCT-VC tests. This confirms that SBH, in particular, and data hiding, in general, can be an efficient compression tool.

In addition to video compression, data hiding can be used in different Digital Rights Management (DRM) applications (e.g., digital watermarking). It is one of the DRM technologies used to embed digital information in a carrier signal (see for example Tirkel et. al., "Electronic Water Mark", Digital Image Computing: Techniques and Applications (DICTA), 1993, Macquarie University, pp. 666-673). This hidden information could be used to verify the authenticity or integrity of the carrier signal or to show the identity of its owners.

In the case, if several hiding operations should be performed on the same set of target values these operations can potentially interfere with each other. This interfering occurs if hiding operation modifies a value of the set without taking into account the effect of this modification on the data hidden during previous hiding operations. So, a simple combination of hiding operations can result in producing an undecodable bit-stream.

As an example of such a situation we could consider hiding of a set of flags within quantized transform coefficients of a TU when SBH should be performed for these coefficients as well. If the flag hiding operation is performed independently (i.e. it is not matched with SBH), extracting hidden signs can be performed incorrectly.

SUMMARY

One object is to suggest a novel method for encoding multiple pieces of data of a data unit to be encoded (coding unit) based on an input set of data (values) comprises in said coding unit. Another object is to suggest a way for decoding such pieces of data from the encoded data unit again. Furthermore, a further object is to suggest a data hiding mechanism, in which several hiding operations can be performed without causing interference, respectively, resulting in an undecodable encoded data.

According to a first aspect of the invention, the data unit to be coded has a hierarchical structure. This means for example that the individual values of the data belonging to the coding unit correspond to a hierarchical structure providing several layers of the coding unit. The idea of this first aspect is to hide information (e.g. a value) belonging to respective given layers based on other information of the coding unit using data hiding patterns. The other information onto which a respective data hiding pattern is applied can be considered an input set of values for a respective data hiding pattern. Several data hiding patterns may be based on identical input sets of values, on partly overlapping input sets of values, or distinct input sets of values or even a combination thereof.

In line with a first exemplary implementation of the first aspect, a method for hiding values of a hierarchically layered coding unit in other values comprised by the coding unit is provided (encoding method). In this method a layered stack of data hiding patterns is provided. The data hiding patterns are for hiding values of the coding unit at different layers of the coding unit. Each of the data hiding patterns has a check function associated to it which is used to hide one or more of said values of the coding unit at one of the layers of the coding unit. For each of the data hiding patterns, the following is performed:

(i) calculating the check function of a respective one of said data hiding patterns based on values selected by the respective data hiding pattern from said other values of the coding unit;

(ii) determining whether the result of the check function corresponds to a value of said coding unit that is to be hidden by the respective data hiding pattern; and (iii) if not, modifying at least one of said values selected by the respective data hiding pattern from said other values of the coding unit so that the result of the check function in step (ii) corresponds to said value of said coding unit that is to be hidden by the respective data hiding pattern.

The encoded coding unit comprises the other values of the coding unit as modified in step (iii) for all data hiding patterns.

In another, second implementation of the first implementation form of the first aspect, the layered stack of data hiding patterns define decoupled data hiding patterns. Decoupled data hiding patterns may be considered fulfilling the criterion that a hidden value restored using any of the data hiding patterns of the stack cannot be derived from a combination (e.g. a linear combination) of the remaining data hiding patterns defined in the stack. If the layered stack of data hiding patterns is decoupled, applying same on the same input data set of values, does not cause interference between different data hiding patterns in the stack, so that the hidden values can be properly restored. Such interference could for example occur, when a hiding operation modifies a value of the input set of values (i.e. the values selected by the data hiding pattern used in the hiding operation), without taking into account the effect of a modification of one or more values of the input set of values in a previous data hiding operation.

Furthermore, in a third implementation of the any previous implementation form of the first aspect, each layer of the coding unit may be associated to one or plural of the data hiding patterns.

In a further fourth implementation of the any previous implementation form of the first aspect, the data hiding patterns may consist of at least one of decimation-based data hiding patterns, one or more regular data hiding patterns, and one or more pseudo-random data hiding patterns.

According to a fifth implementation of the any previous implementation form of the first aspect, the method may further comprise performing the following for each of the data hiding patterns: in case an algorithm used to modify the at least one of said values selected by the respective data hiding pattern from said other values of the coding unit in step (iii) does not modify the values such that the result of the check function in step (ii) corresponds to said value of said coding unit that is to be hidden by the respective data hiding pattern, repeating steps (i) to (iii) until the result of the check function in step (ii) corresponds to said value of said coding unit that is to be hidden by the respective data hiding pattern.

According to a sixth implementation of the any previous implementation form of the first aspect, when performing steps (i) to (iii) using a first data hiding pattern and a second data hiding pattern of said data hiding patterns, respectively, those one or more other values of the coding unit that have been selected by the first data hiding pattern and have been modified in step (iii), are not modified in step (iii) again when performing steps (i) to (iii) for the second data hiding pattern, in case they are selected by the second data hiding pattern in the second iteration.

According to a seventh implementation of the any previous implementation form of the first aspect, said at least one value modified in step (iii) for one of the data hiding patterns are considered instead of the original values when performing steps (i) to (iii) for another one of the data hiding pattern.

According to an eighth implementation of the first aspect, a method of reconstructing hidden values from an encoded coding unit is provided (decoding method). Again, a layered stack of data hiding patterns is provided. This stack has been used by an encoder for hiding said values of the coding unit. Each of the data hiding patterns has a check function associated to it. In this method, for each of the data hiding patterns, the check function of a respective one of said data hiding patterns is calculated based on values selected by the respective data hiding pattern from said other values of the coding unit, wherein the result of the check function corresponds to one of the reconstructed hidden values.

According to a ninth implementation of the any previous implementation form of the first aspect, said values comprised by said coding unit based on which the check functions of said data hiding patterns are calculated are values of the lowest hierarchical layer of the coding unit.

According to a tenth implementation of the ninth implementation form of the first aspect, wherein the check functions of said data hiding patterns associated to a layer other than the lowest hierarchical layer of the coding unit are calculated on values selected by a respective one of the data hiding pattern from a respective subsets of the values of the lowest hierarchical layer of the coding unit.

According to an eleventh implementation of the tenth implementation form of the first aspect, the size of a respective one of the data hiding pattern is determined based on the size of the subset on which the check function of the respective data hiding pattern is calculated.

According to a twelfth implementation of the tenth or eleventh implementation form of the first aspect, a respective subset in a layer other than the lowest hierarchical layer comprises those values of the lowest hierarchical layer of the coding unit that hierarchically belong to an organizational data unit of the respective layer.

According to a thirteenth implementation of the twelfth implementation form of the first aspect, the number and/or size of data hiding patterns applicable to a respective organizational data unit of the respective layer is/are determined based on the size of the subset of values belonging to the respective organizational data unit of the respective layer on which the check function is calculated.

According to a fourteenth implementation of the tenths to thirteenth implementation form of the first aspect, the size of a respective one of the data hiding patterns is equal to or a divisor of the size of the subset on which the check function of the respective data hiding pattern is calculated. To put it different, the size of the subset on which the check function of the respective data hiding pattern is calculated is equal to or an integer multiple of the size of a respective one of the data hiding patterns.

According to a fifteenth implementation of the any previous implementation form of the first aspect, the values of said coding unit represent a block of pixels of an image, and the coding unit has one or more prediction units, one or more transform units, and one or more coefficient groups, wherein the data hiding patterns are associated to layers of the coding unit corresponding to the prediction units, the transform units and the coding unit, respectively. Moreover, each of the data hiding patterns hides one or more values of the associated layer of the coding unit.

According to a sixteenth implementation of the fifteenth implementation form of the first aspect, the data hiding patterns are associated to layers of the coding unit corresponding to the coefficient groups, the prediction units, the transform units and the coding unit, respectively, wherein the coefficient groups are part of the lowest layer of the coding unit.

According to a seventeenth implementation of any previous implementation form of the first aspect, the check functions of the data hiding patterns are calculated based on the values of the coefficient groups.

According to an eighteenth implementation of the fifteenths to seventeenth implementation form of the first aspect, the data hiding patterns comprise one or more data hiding patterns for hiding a reference sample filtering flag for intra prediction for the transform units of the coding unit.

According to a nineteenth implementation of the fifteenths to eighteenth implementation form of the first aspect, the data hiding patterns comprise one or more data hiding patterns for hiding at least one of a prediction mode index and a size of the prediction units.

According to a twentieth implementation of the fifteenths to nineteenth implementation form of the first aspect, the data hiding patterns comprise a data hiding pattern for embedding a watermark to the coding unit.

According to a twenty-first implementation of the fifteenths to twentieth implementation form of the first aspect, the data hiding patterns comprise at a data hiding pattern for hiding the sign bits of coefficients of the coefficient groups.

According to a twenty-second implementation of the first to fourteenth implementation form of the first aspect, the values of said coding unit represent a block of image data, a block of audio data, or a block of a document to be encoded.

According to a twenty-third implementation of the first to twenty-second implementation form of the first aspect, one of the hidden values allows confirming authenticity of the values comprised in the coding unit.

A twenty-fourth implementation of the first aspect of the invention provides an encoding apparatus for hiding values of a hierarchically layered coding unit in other values comprised by said coding unit. The encoding apparatus is provided with a layered stack of data hiding patterns for hiding said values of the coding unit at different layers of the coding unit, wherein each of the data hiding patterns has a check function associated to it for hiding one or more of said values of the coding unit at one of the layers of the coding unit. The encoding apparatus comprises a processing unit configured to perform the following for each of the data hiding patterns:

(i) calculating the check function of a respective one of said data hiding patterns based on values selected by the respective data hiding pattern from said other values of the coding unit;

(ii) determining whether the result of the check function corresponds to a value of said coding unit that is to be hidden by the respective data hiding pattern; and (iii) if not, modifying at least one of said values selected by the respective data hiding pattern from said other values of the coding unit so that the result of the check function in step (ii) corresponds to said value of said coding unit that is to be hidden by the respective data hiding pattern.

The encoding apparatus further comprises output unit configured to output an encoded coding unit, the encoded coding unit comprising the other values of the coding unit as modified in step (iii) for all data hiding patterns.

A twenty-fifth implementation of the first aspect of the invention provides an encoding apparatus configured to perform the method according to any implementation form of the first aspect.

A twenty-sixth implementation of the first aspect of the invention provides a decoding apparatus for reconstructing hidden values from an encoded coding unit. The decoding apparatus is provided with a layered stack of data hiding patterns that has been used by an encoder for hiding said values of the coding unit, wherein each of the data hiding patterns has a check function associated to it. The decoding apparatus comprises a processing unit configured to calculate, for each of the data hiding patterns, the check function of a respective one of said data hiding patterns based on values selected by the respective data hiding pattern from said other values of the encoded coding unit, wherein the result of the check function corresponds to one of the reconstructed hidden values; and an output unit to output the decoded coding unit comprising, as part of the decoded data, said reconstructed hidden values.

According to a twenty-seventh implementation of the first to twenty-sixth implementation form of the first aspect, the values selected by the respective data hiding pattern from the encoded coding unit are values of the lowest hierarchical layer of the coding unit.

According to a twenty-eighth implementation of the first to twenty-seventh implementation form of the first aspect, the processing unit is further configured to calculate the check functions of said data hiding patterns associated to a layer other than the lowest hierarchical layer of the encoded coding unit on values selected by a respective one of the data hiding pattern from a respective subsets of the values of the lowest hierarchical layer of the coding unit.

According to a twenty-ninth implementation of the first to twenty-eighth implementation form of the first aspect, the processing unit is configured to determine the size of a respective one of the data hiding patterns based on the size of the subset on which the check function of the respective data hiding pattern is calculated.

According to a thirtieth implementation of the first to twenty-eighth or twenty-ninth implementation form of the first aspect, a respective subset in a layer other than the lowest hierarchical layer comprises those values of the lowest hierarchical layer of the coding unit that hierarchically belong to an organizational data unit of the respective layer.

According to a thirty-first implementation of the first to thirtieth implementation form of the first aspect, the processing unit is configured to determine the number and/or size of data hiding patterns applicable to a respective organizational data unit of the respective layer based on the size of the subset of values belonging to the respective organizational data unit of the respective layer on which the check function is calculated.

A thirty-second implementation of the first aspect of the invention provides a decoding apparatus configured to perform a decoding method according to any implementation form of the first aspect.

A thirty-third implementation of the first aspect of the invention provides a (non-transitory) computer readable medium that stored instructions that, when executed by a processing unit of an encoding apparatus, cause the encoding apparatus to perform the following for each of the data hiding patterns:

(i) calculating the check function of a respective one of said data hiding patterns based on values selected by the respective data hiding pattern from said other values of the coding unit;

(ii) determining whether the result of the check function corresponds to a value of said coding unit that is to be hidden by the respective data hiding pattern; and (iii) if not, modifying at least one of said values selected by the respective data hiding pattern from said other values of the coding unit so that the result of the check function in step (ii) corresponds to said value of said coding unit that is to be hidden by the respective data hiding pattern.

Furthermore, the instruction may further cause the processing unit of the encoding apparatus to comprise, in encoded coding unit, the other values of the coding unit as modified in step (iii) for all data hiding patterns.

A thirty-fourth implementation of the first aspect of the invention provides a (non-transitory) computer readable medium that stored instructions that, when executed by a processing unit of an encoding apparatus, cause the encoding apparatus to perform an encoding method according to any implementation form of the first aspect.

A thirty-fourth implementation of the first aspect of the invention provides a (non-transitory) computer readable medium that stored instructions that, when executed by a processing unit of an encoding apparatus, cause the encoding apparatus to provide a layered stack of data hiding patterns, where the stack has been used by an encoder for hiding said values of the coding unit. Each of the data hiding patterns has a check function associated to it. The instructions further cause the decoding apparatus to calculate, for each of the data hiding patterns, the check function of a respective one of said data hiding patterns based on values selected by the respective data hiding pattern from said other values of the coding unit, wherein the result of the check function corresponds to one of the reconstructed hidden values.

A thirty-sixth implementation of the first aspect of the invention provides a (non-transitory) computer readable medium that stored instructions that, when executed by a processing unit of a decoding apparatus, cause the decoding apparatus to perform an decoding method according to any implementation form of the first aspect.

BRIEF DESCRIPTION OF FIGURES

In the following embodiments of the invention are described in more detail in reference to the attached figures and drawings. Similar or corresponding details in the figures are marked with the same reference numerals.

FIG. 3a and FIG. 3b and FIG. 3c and FIG. 3d and FIG. 3e and FIG. 3f are a different examples of one-dimensional decoupled data hiding patters according to embodiments of the invention.

DETAILED DESCRIPTION

The following paragraphs will describe various implementations and embodiments of the different aspects. As already noted above, one aspect of the invention relates to performing multiple data hiding operations on the data of a coding unit.

A coding unit generally refers to structure that contains a set of data to be coded. The coding unit is assumed to have a hierarchical structure. This means, for example, that the individual values representing the data belonging to the coding unit correspond to a hierarchical structure providing several layers of the coding unit. Such layering may be for example realized by the structure defining a coding tree, where the coding unit layer defines the root of the tree and the data of each branch in the tree belong to the next lower layer. The data in the coding unit is represented by data values (values in short) that represent information at the different layers of the structure. The data values may be represented in binary format. Data hiding operations, and in particular the calculation of check functions may be performed on the values, but they could also be performed on the binary representation (bit level), as needed.

Figure 1:
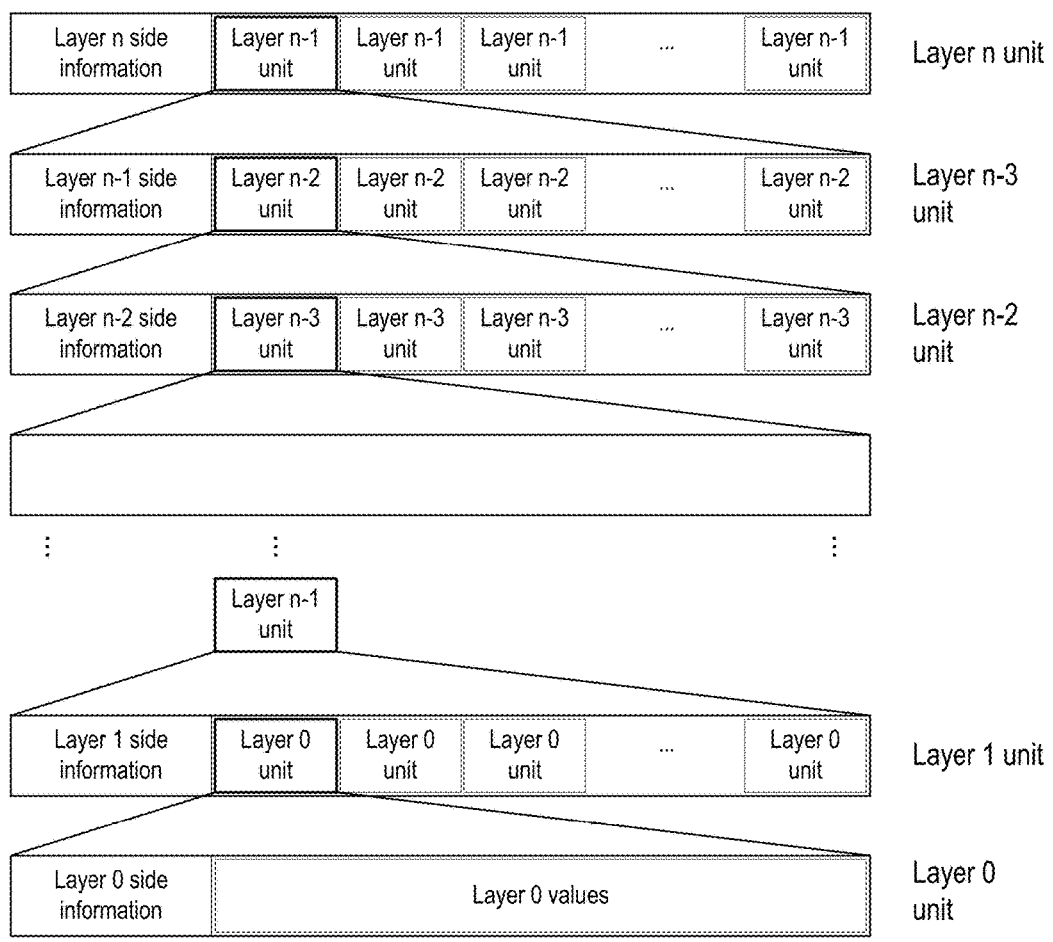
FIG. 1 shows an exemplary structure (coding tree) of a coding unit according to an exemplary embodiment of the invention.

An exemplary coding tree is shown in FIG. 1. The structure of the coding unit (Layer n unit, highest layer unit) thus defines the highest layer in the hierarchical order of layers of the coding tree. Each unit at each layer (except for the lowest layer) may consist of side information of the respective layer and one or more lower layer units. Note that depending on the application of an embodiment of the invention, there may be no side information in one or more layers. The lowest layer unit (Layer 0 unit) may for example comprise or consist of values, and optionally there may also be side information.

The idea of a first aspect of the invention is to hide information (e.g. one or more values of the coding unit) belonging to distinct layers based on other values of the coding unit using data hiding patterns (DHPs). For example, data to be hidden may be one or more side information of a respective layer that would otherwise have to be coded explicitly in the encoded data. In one implementation, the side information of a respective layer's data structure (e.g. Layer n−1 unit or any other lower layer unit) may be hidden within the values belonging to the respective data structure.

Which information (or values) in which layer is hidden in the encoded coding unit may be for example predetermined, or may be signaled to the decoding apparatus. Also the data hiding patterns used on the respective different layers may be predetermined, or may be derivable from parameters of the encoded coding unit, e.g. the size of the respective. The same data hiding pattern or patterns may be reused in one layer X for each of the Layer X units of this layer.

In some embodiments the values on which the data hiding operation is based belong to the lowest hierarchical layer of the coding unit. These values to which a respective data hiding pattern is applied can be considered an input set of values for a respective data hiding pattern. Several data hiding patterns may be based on identical input sets of values, on partly overlapping input sets of values, or distinct input sets of values or even a combination thereof.

Generally, assuming for exemplary purposes only a check function with a binary result, one data hiding pattern may hide one bit of information. Accordingly, the number of data hiding patterns corresponds to the number of bits to be hidden for one respective layer's unit, unless the input data set is large enough so that the same data hiding pattern can be applied to respective subsets thereof. The data hiding patterns for one layer's data unit may thus define a stack of data hiding patterns which are decoupled. The decoupling of the data hiding patterns ensures that the hidden bits may be reconstructed from the encoded coding unit again. Advantageously, the decoupling of the data hiding patterns is not only provided for the data hiding patterns for one single layer, but the data hiding patterns are decoupled across all layers of the coding unit. As noted previously, "decoupled" means that the value restored using any data hiding pattern from any layer could not be derived by combination (e.g., linear combination) of the rest of data hiding patterns defined for this layer. In other words, a stack of decoupled data hiding patterns could be described by a non-degenerate system of equations that derives the extracted values from the given set of target values.

A layered stack of decoupled data hiding patterns may be for example constructed in various ways. FIG. 3a and FIG. 3b and FIG. 3c and FIG. 3d and FIG. 3e and FIG. 3f are a show different examples of one-dimensional decoupled data hiding patters, which may be classified into three groups: decimation-based, regular and irregular (pseudo-random). In FIG. 3a and FIG. 3 b present two examples of decimation-based DHPs; (c), (d), and (e) illustrate three different examples of other regular DHPs; and (f) demonstrates an example of irregular (pseudorandom) DHPs Decimation-based data hiding patterns may be constructed in such a way that every $n^{th}$ element of a given set of values could be used for data hiding. In a more general case, if elements of the set are selected by a data hiding pattern regularly, i.e. in accordance with some regular order, these data hiding patterns could be classified as regular data hiding patterns. All the other cases that do not define any regular order inside data hiding patterns could be grouped into the class of irregular or pseudo-random data hiding patterns.

Figure 4:
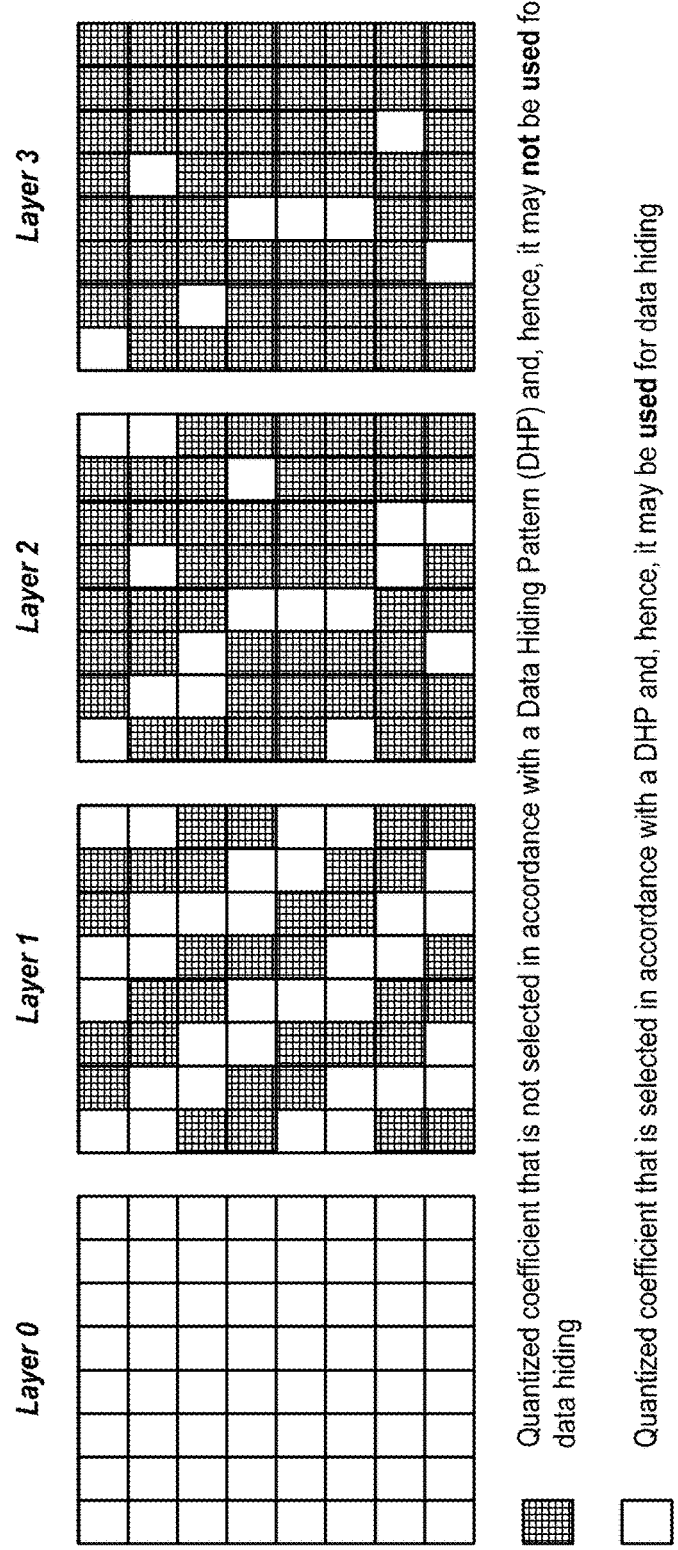
FIG. 4 shows different examples of two-dimensional decoupled data hiding patters according to an embodiment of the invention.

Stack of layers can consist of data hiding patterns of different classes but with the constraint on these data hiding patterns being decoupled ones. Moreover, data hiding patterns could be two-dimensional or even multi-dimensional ones. An example of a two-dimensional layered stack of data hiding patterns is given in FIG. 4. Two-dimensional data hiding patterns could be for example applied to quantized transformed coefficients just as one-dimensional ones, but data hiding and extraction procedures in that case would take place before coefficients scan.

Figure 2:
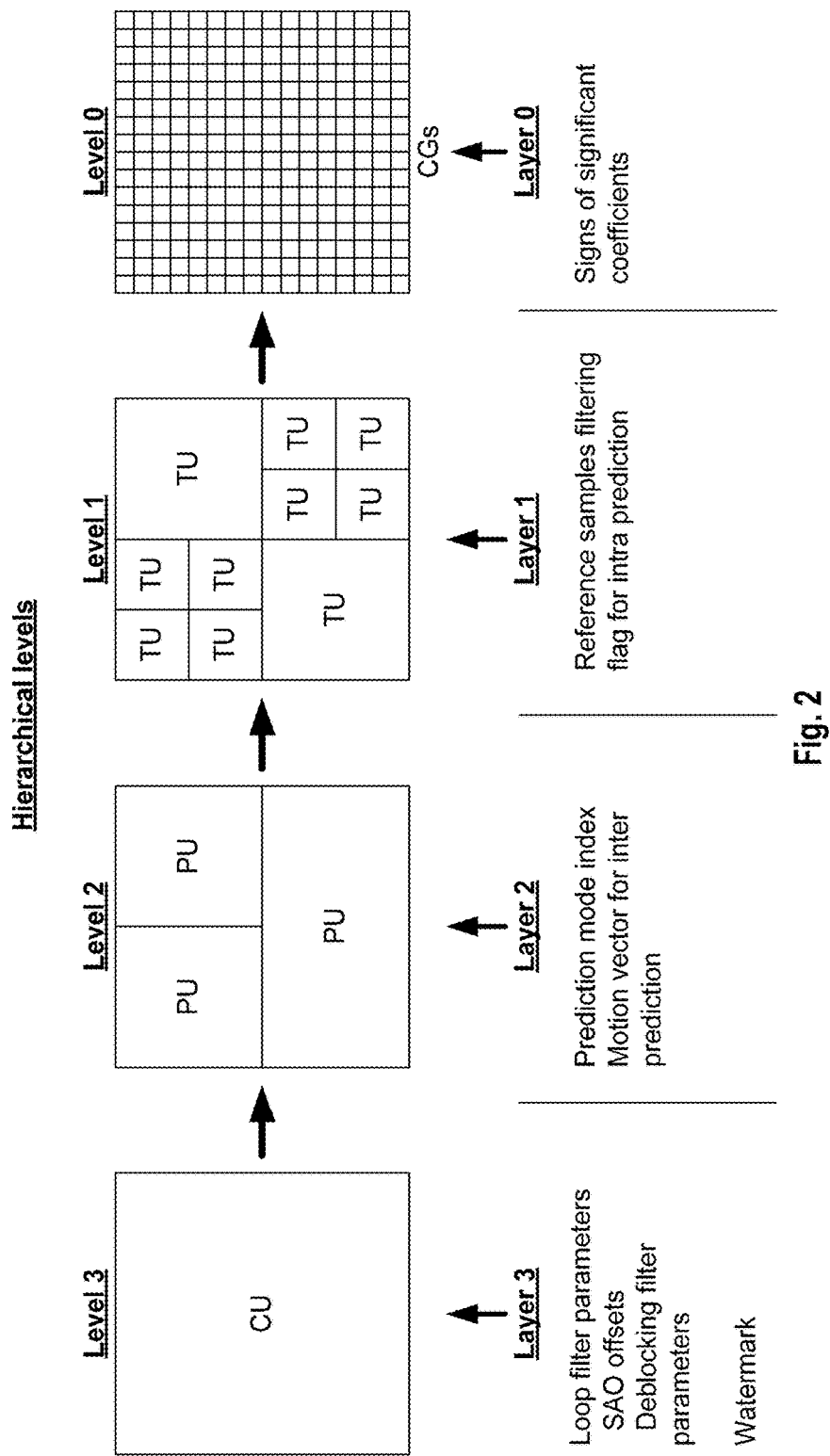
FIG. 2 shows a an exemplary structure of a coding unit of an embodiment of the invention, which is similar to the coding unit structure in the H.265 standard.

In the following examples, it is assumed most of the time that an embodiment of the invention is used in the video coding context. The data of the coding unit thus represent a block of pixels of an image. For exemplary purposes, the coding unit is assumed to have a coding tree structure similar to the H.265 standard: The coding unit has one or more predication units, one or more transform units, and one or more coefficient groups. This exemplary layered structure is shown in FIG. 2, where the respective layers of the coding unit (CU) are highlighted. Furthermore, the parameter identified for the individual layers list exemplary side information that may be hidden for a respective layer's data unit (CU, PU, TU and CG). Furthermore, it is exemplary assumed that the data hiding operation on each layer is performed based on the transform coefficient values of the CG(s) belonging to the respective layer's data unit (CU, PU, TU and CG). Thus the input data set for the data hiding operation(s) performed for the respective layer's data units may be different. This may allow reusing the same data hiding pattern(s) for different respective layer's data units.

Figure 5:
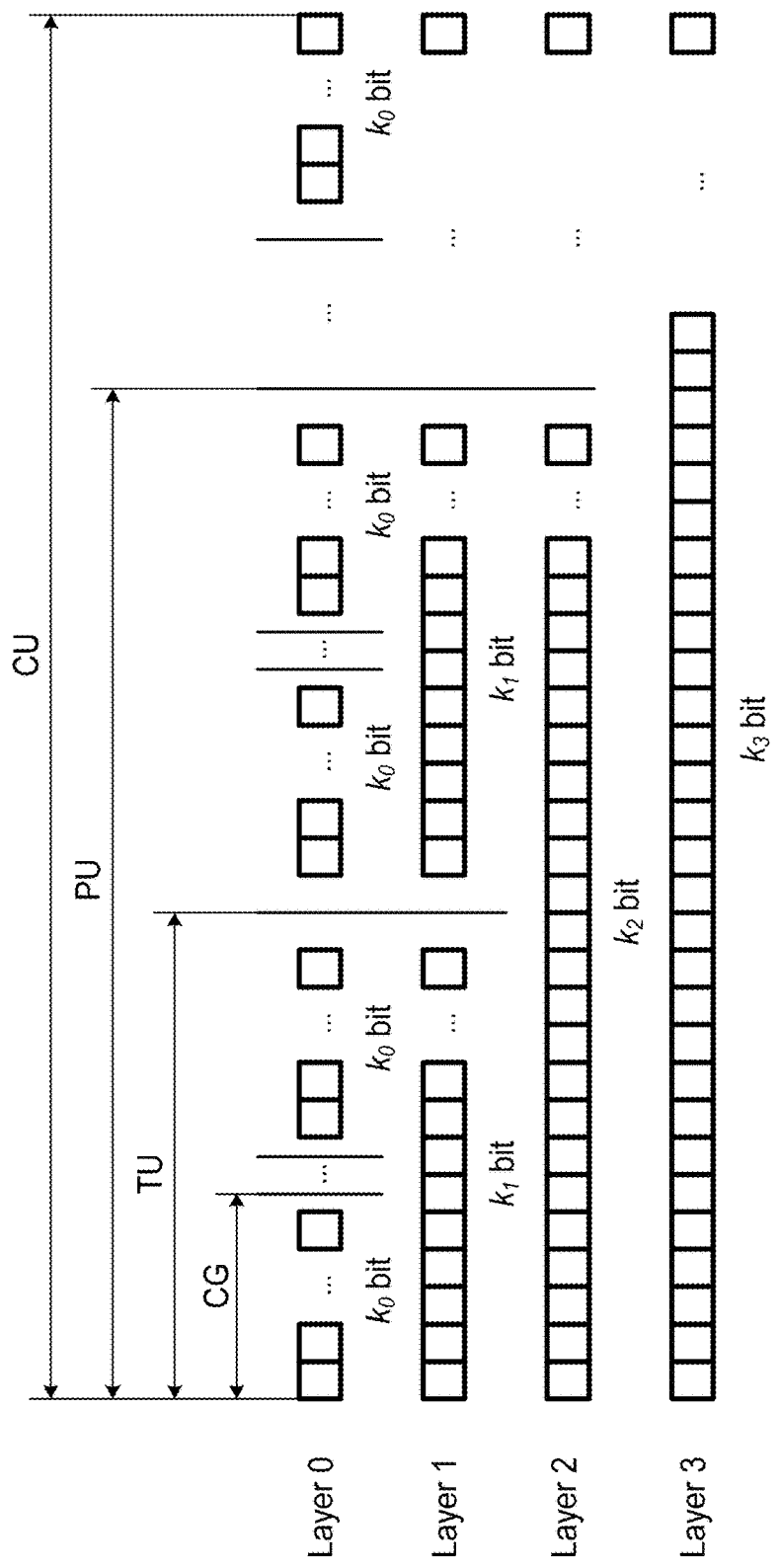
FIG. 5 shows an exemplary embodiment of the structure of a layered stack of data hiding patterns defined for the different layers in FIG. 2 according to an embodiment of the invention.

FIG. 5 shows an exemplary embodiment of the structure of a layered stack of data hiding patterns defined for the different layers in FIG. 2. In this example, it is assumed only for exemplary purposes only that there is one data hiding pattern for each respective layer's data unit in a respective one of the four layers.

On the lowest layer (Layer 0), the CG layer, one value of each CG is to be hidden (for example the sign flags of the (significant) transform coefficients of the respective CG). Note that the full set of transform coefficients is considered (e.g. for a CG of size 4×4, all 16 significant and insignificant coefficients are considered, although only the significant coefficients may be encoded in the encoded coding unit).

Using respective data hiding patterns and a check function (e.g. a parity check function), the signs of one or more significant coefficients within a given CG can be coded. The size of the data hiding pattern(s) is equivalent to (or a divisor of) the size of the CG (for example, 16 values for a 4×4 CG), and selects a subset of the coefficient values of the CG for application of the check function. The data hiding operation may be applied not to all the CGs but just to those CGs that meet the threshold condition. For example, in case difference of positions of the first and last significant coefficients should be more or equal to four, data hiding is used.

In one example, for each value of a CG to be hidden, a corresponding data hiding pattern (and check function) defined. Hence, if for example the signs of 4 significant coefficients are to be hidden, there are 4 distinct data hiding patterns defined each of which is used to hide one sign bit (assuming that the size of the data hiding pattern is equal to the size of the CG (i.e. number of its coefficients)). In the example of FIG. 5, one sign bit of one of the significant coefficients could be hidden for one CG. Note that the set of data hiding patterns used for hiding the sign bit(s) of the different CGs could be identical for all CGs of the coding unit. However, also different sets of data hiding patterns could be used.

Turning now to the TU level, i.e. Layer 1 in the example of FIG. 5, several CGs typically belong to a single TU. Accordingly, for hiding side information of a TU (for example a reference sample filtering flag of the TU), the input data set for the data hiding operation may now be the transform coefficients of all CGs belonging to the respective TU. Accordingly, the data hiding pattern(s) of the TU layer may have a size that is equal to the size of the CGs, as shown in FIG. 5. If multiple bits need to be hidden in the TU layer, a corresponding number of decoupled data hiding patterns is defined.

Alternatively, the size of the data hiding pattern(s) of the TU layer may a divisor of the size of the CGs (not shown in FIG. 5). As will be explained below, the data hiding patterns may have a maximum size. In this case, an integer multiple of the size of data hiding pattern may be equal to the size of the CGs belonging to the TU (i.e. the number of coefficients of the different CGs belonging to the TU). In this case, the same data hiding pattern may be applied multiple times to different subsets of the CGs belonging to the TU to hide multiple bits.

Similar to the TU layer, also in the PU layer, i.e. Layer 2 in the example of FIG. 5, several CGs may belong to a single PU. Accordingly, the input data set for the data hiding operations on the PU layer may be again larger than that of the TU level. The data hiding pattern(s) on the PU layer may be again equal in size to the size of the CGs belonging to the respective PU, or alternatively, the size of the data hiding pattern(s) of the PU layer may a divisor of the size of the CGs (not shown in FIG. 5), facilitating the reuse of the data hiding pattern(s) for different subsets of the coefficient values of the CGs belonging to the respective PU in hiding multiple bits.

Generally, the data hiding pattern(s) may be used to hide also a non-binary value, such as for example a prediction mode index or a motion vector (index) for the PU. Depending on the size of the data hiding pattern and the number of coefficients belonging to the respective layer's unit, one or more data hiding patterns are needed to do so. Assuming that a PU has multiple TUs, it can be expected that the number of transform coefficients of the CGs belonging to the CGs of the PU is significantly larger than the (maximum) size of the data hiding pattern(s) for the PU layer so that even one data hiding pattern may be used to hide non-binary values, like a prediction mode index or a motion vector (index) for the PU.

Finally, at the CU layer, i.e. Layer 3 in the example of FIG. 5, all coefficients of all CGs of a CU can be used for the data hiding process. Accordingly, it may be possible to hide one or several side information on the CU layer. For example, loop filter parameters, sample adaptive offset (SAO) values, or de-blocking filter parameters may be hidden by means of a data hiding operation within the coefficients of the CGs of the CU, as described above for the TU and PU layers.

Furthermore, it is also possible to add a watermark (fingerprint) at any of the layers, as will be explained below.

As will become more apparent, the data hiding operations may need to modify individual values at the lowest layer (e.g. the coefficient values of the CG layer to stay with the previously discussed examples of FIGS. 2 and 5) such that the check functions applied to the values selected by the respective data hiding patterns provide the correct result for hiding the data to be hidden at the different layer. Accordingly, when considering for example audio, picture or video coding, the modification of the lowest layer data may result in distortion of the decoded signal. The distortion caused by a modification of a value may be for example defined in terms of "costs", and algorithms for deciding which of the lowest layer value(s) need modification may be take their decision based on the costs (i.e. an estimated decrease in quality) of a modification of the respective values forming the input data set of the data hiding operation (i.e. the values selected by the data hiding patterns). The distortion introduced by a hiding operation will also dependent on the number of values selected by the respective data hiding patterns (i.e. the number of candidates available for modification), and how those values are distributed across the entire set of values of the lowest layer values of the coding unit. Generally, speaking one can expect the distortion introduced by a data hiding operation to decrease with the size of the data hiding pattern, as more values may be selected and/or the selected values are distributed across a larger set of values. Another factor is of course the number of data hiding operations performed for a coding unit.

However, the reduction in distortion of the decoded signal between different lengths of the data hiding pattern will become lower, the larger the data hiding patterns become. Hence, it is meaningful to define a maximum length of the data hiding patterns, as this may allow (typically on higher layers) applying data hiding patterns of a maximum length multiple times on the lowest layer values associated to a respective layer's values, as explained above in connection with the CU, PU and TU layers. This may reduce distortion introduced by data hiding and may also reduce complexity in defining a decoupled stack of data hiding patterns.

Yet, as the number of bits to be hidden per layer may be predetermined, and the size of the respective layer's units (and thus the number of lowest layer values associated to them) may be dynamically selected in the encoding process, the encoding apparatus as well as the decoding apparatus may dynamically decide on the stack of data hiding patterns (e.g. the number of data hiding patterns per layer and their size) to be used for encoding and decoding a respective coding unit. Yet the selection of the stack of data hiding patterns to be used for encoding and decoding a respective coding unit, might be decided based on the structure of the coding unit (e.g. the size of the respective layer's units) as will be outlined in more detail below, so that no additional signaling overhead may be necessary to signal the stack of data hiding patterns used in encoding to the decoding apparatus, while still enabling the dynamic use of different stacks of data hiding patterns to reduce distortion introduced by data hiding.

Considering now the decoding of hidden data, i.e. the reconstruction of the hidden values at the different layers from the encoded coding unit, the decoupled stack of data hiding patterns used in the different layers may not be predetermined, but derivable from the structure of the encoded coding unit. For example, the stack of data hiding patterns could be adaptively derived by the encoding and decoding apparatus based on parameters of the coding units, such as for example the size of the CGs, TUs, PUs and CU, as will be outlined below.

To explain this concept, the following simplified example will be considered without loss of generality. It is assumed that the data hiding patterns have a maximum size of 16 bits (i.e. select values from a set of 16 coefficients of a CG). Furthermore, it is assumed that the CG has either of size 4×4, yielding 16 coefficients per CG, or of size 8×8 yielding 64 coefficients per CG. Moreover, it is assumed that that the sign of the first four significant coefficients in the CG are encoded by data hiding (four bits are to be hidden). Furthermore, for the CG layer, there are four predetermined data hiding patterns DHP1, DHP2, DHP3 and DHP4, which are decoupled, and which each have a size of 16 bits. Each data hiding patterns DHP1, DHP2, DHP3 and DHP4 uses a parity check function as a check function for data hiding, so that each data hiding pattern can be used to hide one single bit.

In the encoding process, in case the coding unit has a structure yielding a 4×4 CG, i.e. there are 16 coefficients in the CG, the processing unit of the encoding apparatus will perform four data hiding operations for hiding the four sign bits on the 16 coefficients in the CG using the four data hiding patterns DHP1, DHP2, DHP3 and DHP4. Similarly, on the decoding apparatus side, in the decoding process, the processing unit of the decoding apparatus recognizes the size of the CG to be 4×4 and calculates, for each of the DHP1, DHP2, DHP3 and DHP4, the four results of the parity check function based on the coefficients selected out of the CG's 16 coefficients by each of the four data hiding patterns DHP1, DHP2, DHP3 and DHP4.

In case the coding unit has a structure yielding a 8×8 CG, i.e. there are 64 coefficients in the CG, the processing unit of the encoding apparatus will partition the 64 coefficients into different subsets of 16 coefficients each, and will then perform four data hiding operations for hiding the four sign bits on the respective subsets of 16 coefficients. In these four data hiding operations that are based on the four different subsets of coefficient, the processing unit of the encoding apparatus may use either one of the four data hiding patterns DHP1, DHP2, DHP3 and DHP4, or alternatively all of them or a subset of the four data hiding patterns DHP1, DHP2, DHP3 and DHP4. Which one or more of the four data hiding patterns DHP1, DHP2, DHP3 and DHP4 are used in the encoding apparatus may be predetermined so that this information does not have to be signaled to the decoding apparatus.

Similarly, on the decoding apparatus side, in the decoding process, the processing unit of the decoding apparatus recognizes the size of the CG to be 8×8. The decoding apparatus forms four subsets of 16 coefficients each from the 64 coefficients in the CG (note that the partitioning is of course the same as in the encoding apparatus, and may be predetermined). Then the decoding apparatus calculates the four results of the parity check function based on the respective subsets of 16 coefficients using the same one or more of the four data hiding patterns DHP1, DHP2, DHP3 and DHP4 used by the encoding apparatus.

Comparing the case of hiding four bits in a 4×4 CG by use of four data hiding operations performed on the same set of coefficients, and the case of hiding four bits in a 8×8 CG by use of four data hiding operations performed on different subsets of coefficients, it becomes more apparent that the distortion introduced by the modifications of the coefficients so as to ensure that the parity check function yields the correct sign flag (bit value) for each of the four signs may cause more distortion in the decoded signal for a 4×4 CG in comparison to a 8×8 CG.

Accordingly, one could consider foreseeing a flag in the side information of 4×4 CGs that can signal whether or not data hiding has been used during encoding of the CG. Alternatively, this flag may be foreseen in the TU side information to signal whether or not data hiding is used in encoding the 4×4 CGs of the TU or not. The encoding apparatus could decide the use of data hiding for 4×4 CGs based on a predetermined or configurable distortion threshold.

Note that for the reconstruction of hidden data, the decoding apparatus may only determine the 16 coefficients (i.e. the significant and insignificant coefficients) of the CG from the encoded CGs, but there is no need to perform a reverse transformation of the coefficients from the spectrum into the time domain.

This latter point may be particularly advantageous when using data hiding in watermarking applications (e.g. on a higher layer than the CG layer, e.g. on the CU layer), as the watermark may be checked without having to perform a reverse transformation of the coefficients from the spectrum into the time domain. The decoding (e.g. reverse transformation) of the lowest layer data may thus only be performed by the decoding apparatus if the watermark could confirm authenticity of the encoded data, so that significant processing resources can be saved, if the watermark is not confirmed.

Although the example above relates to adaptively hiding data in the CG layer, similar mechanisms may be used for example on one or more of the TU layer, the PU layer and the CU layer. For instance, in FIG. 2, some of the TUs have 4×4=16 CGs associated thereto, while other TUs have 8×8=64 CGs associated thereto. Considering that there are 4×4=16 or 8×8=64 coefficients per CG, it is apparent that the possible input data set for the data hiding operations may be based on subsets of the entire number of coefficients belonging to the TU, instead of all of them.

In one exemplary implementation, it is assumed for exemplary purposes that 8 bits are to be hidden per TU. For a TU having 16 CGs of size 4×4 this yields a total number of 256 coefficient values on which the data hiding operations can be performed. Considering for exemplary purposes only a data hiding pattern of 32 bits, this single data hiding pattern would be sufficient for hiding the 8 bits in the 256 coefficients. The data hiding pattern would be applied in 8 data hiding operations on distinct subsets of 32 coefficients out of the 256 coefficients. One may of course also consider defining more than one data hiding pattern of length 32 bits, e.g. in order to ensure that the stack of data hiding patterns across all layers is decoupled. Hence, on the decoding apparatus side, a TU size of 4×4 and a CG size of 4×4 would cause the decoding apparatus to select the predetermined data hiding pattern (or patterns) of 32 bit each (as used by the encoding apparatus) and to reconstruct the 8 hidden bits from respective predetermined subsets of 32 coefficients out of the 256 coefficients belonging to the TU.

For a TU having 16 CGs of size 8×8 or a TU having 64 CGs of size 4×4, this yields a total number of 1024 coefficient values on which the data hiding operations can be performed. One possibility may be to increase the size of the data hiding pattern (and the subset of coefficients on which they are applied accordingly) according to the increased size of the CGs, i.e. to define one or more data hiding patterns of 128 bits each, that are used to hide and reconstruct the 8 hidden bits using respective predetermined subsets of 128 coefficients out of the 1024 coefficients belonging to the TU.

Alternatively, the same data hiding pattern(s) as used for the case of a 4×4 TU with 4×4 CGs could be used, which are then operated on predetermined 256 of the 1024 of the coefficients belonging to the TU. The remaining 768 coefficients of the TU may not be used.

In another alternative, the same data hiding pattern(s) as used for the case of a 4×4 TU with 4×4 CGs could be used, but the remaining 768 coefficients of the TU may be used to hide additional bits (i.e. a total of 32 bits could be hidden).

For a TU having 64 CGs of size 8×8, the number of available coefficients for data hiding increases to 4096 coefficients. Similar to the case above, this may be used to increase the data hiding pattern size accordingly, to use only a subset of the coefficients for data hiding (while maintaining the size of the data hiding pattern(s)) or to hide more data in the TU.

The decision on how many bits are hidden in each of the layers should also consider the overall distortion introduced by the data hiding operations in the decoded signal. However, if the data hidden on each layer is predetermined, parameters like the size of the respective layer's data unit (CU, PU, TU, CG) and/or the size of one or more of the respective lower layers' data units (PU, TU, CG) can imply the stack of data hiding patterns used by the encoding apparatus to the decoding apparatus, when decoding the encoded coding unit.

Turning to the data hiding operation, same may be implemented as follows. It is assumed that the check functions associated to the data hiding patterns have a binary result, so that they can hide one bit of information in the input data set (e.g. the coefficients of the CG(s)). For each data hiding pattern of each layer, the respective data hiding patterns selects a subset of the values of the input data set (or all values thereof) and calculates the check function on the selected set of values. The binary result of this calculation is compared to the binary information to be hidden. If the result matches the binary information to be hidden, no modification of any of the selected values is necessary. If the result does match the binary information to be hidden, one or more of the values selected by the data hiding pattern from the input data set needs to be modified, so that the result of the check function matches the binary information to be hidden.

In one exemplary implementation, the necessary modification of the values selected by the data hiding pattern from the input data set is performed by using an algorithm which is capable of determining the value(s) that are to be modified while minimizing the distortion introduced by the modification of the selected value(s).

In case of using several data hiding patterns on different hierarchical layers which have a partial overlap in the selection of values (see FIGS. 4 and 5) the encoding apparatus ensures that a value selected and modified in a first data hiding operation is not modified again in another second data hiding operation which selects this value again. Furthermore, the second data hiding operation needs to consider the selected and modified value when calculating the check function. This is important for implementations where the data hiding is performed for the individual data hiding patterns (and layers) sequentially.

Alternatively, implementations are possible where all check functions for all data hiding patterns are calculated first, and then one algorithm is used to modify the values of the lowest layer of the coding unit for all data hiding patterns so that each of the check functions provides the correct result.

Also hybrid implementations of these two alternatives are possible, where for example the individual layers are processed sequentially, but for a single layer, all check functions are calculated for all data hiding patterns of the single layer and the modification algorithm modifies the values of the lowest layer of the coding unit for all data hiding patterns of the single layer so that each of the check functions provides the correct result.

Figure 6:
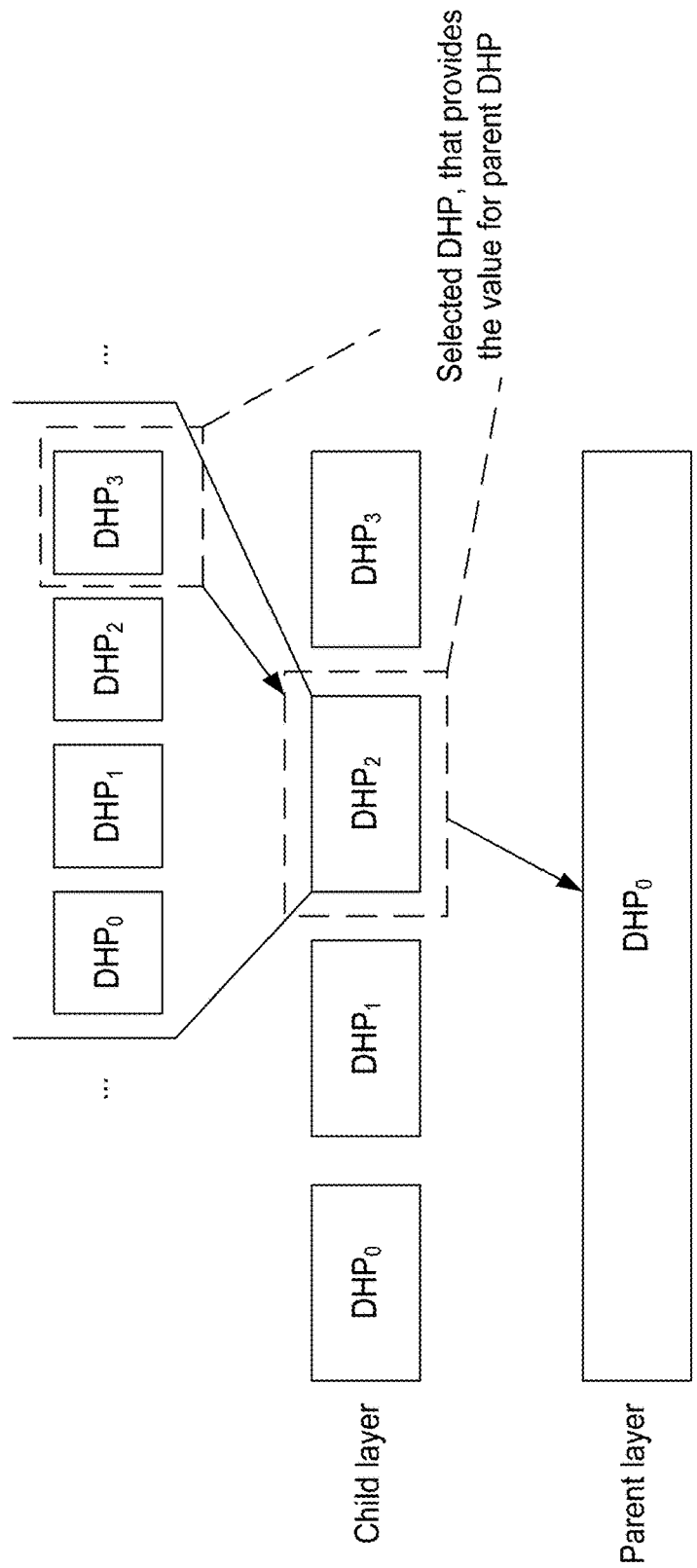
FIG. 6 shows an exemplary hierarchical structure of data hiding patterns according to an exemplary embodiment of the invention.

For the hierarchical structure as shown in FIG. 1 a special rule of coefficients adjustment could be applied to a DHP that guarantees the correct coefficients adjustment (FIG. 6). For a given DHP 601 of a layer a set of child DHPs 602,603 could be found. Within this set of DHPs one special DHP 603 could be selected. While other child DHPs 602 control the check function values of themselves and their respective child DHPs, the selected DHP 603 should additionally control the value of the given parent DHP 601. The same rule being recursively applied to each of the child DHPs provides the target check function values for all the DHPs 601-605.

Figure 7:
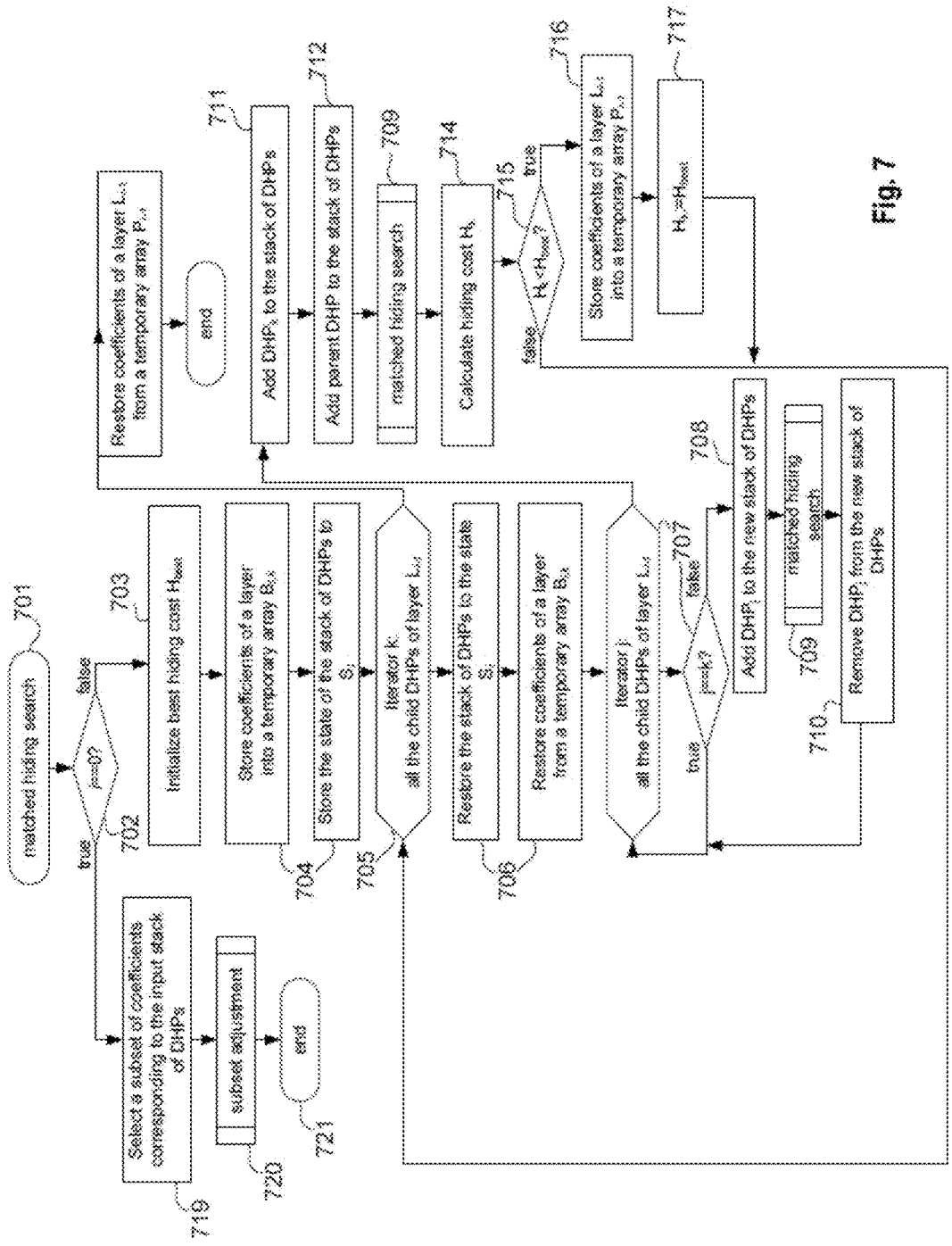
FIGS. 7 & 8 show a flowchart of a procedure for coefficient adjustment on the encoder side for multi-layer hierarchically structured data hiding patterns according to an exemplary embodiment of the invention.
Figure 8:
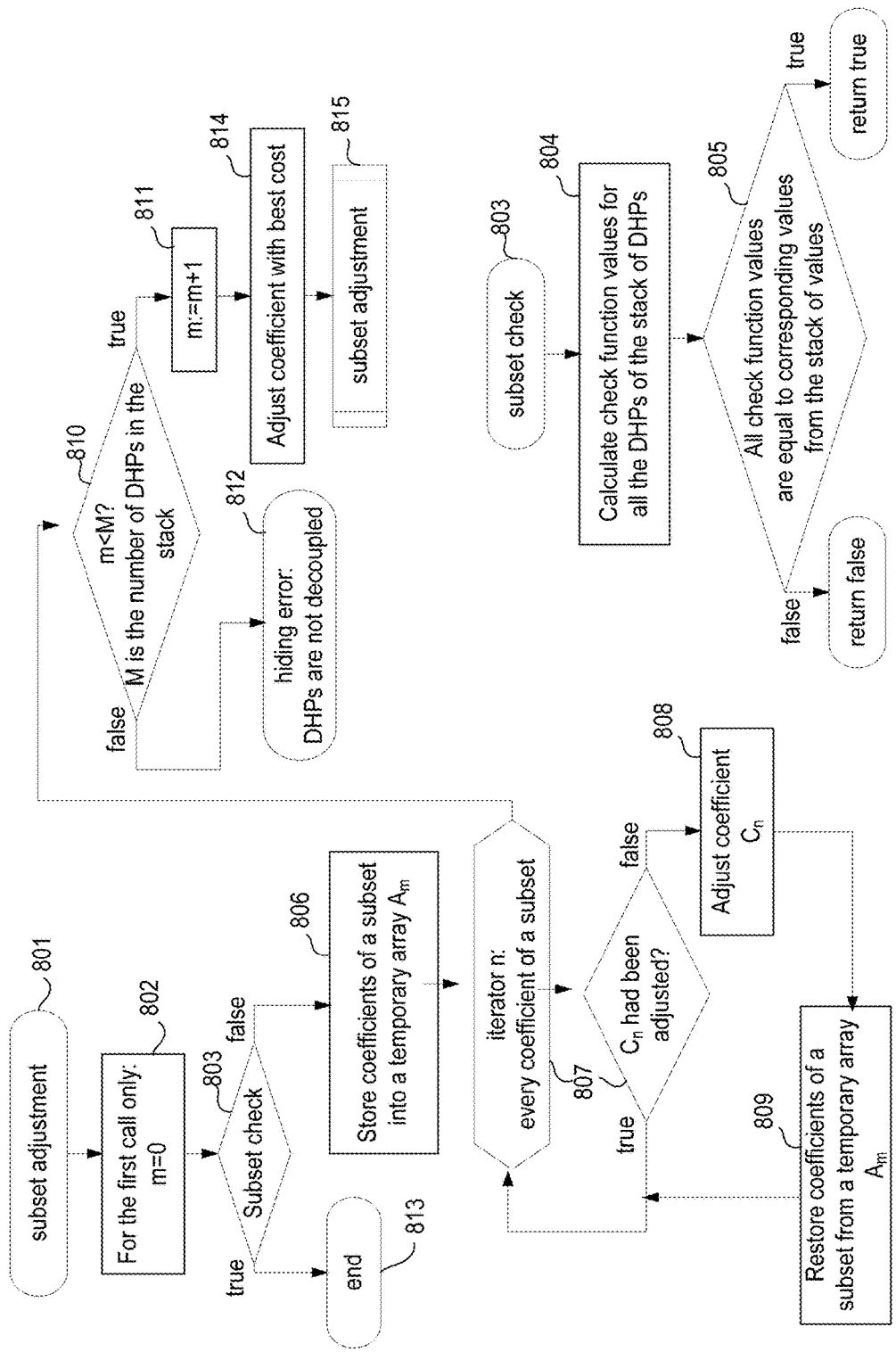

An exemplary flowchart of procedure of data hiding including coefficients adjustment on the encoder side for multi-layer hierarchically structured DHPs is shown in FIG. 7 and FIG. 8. The encoding process may for example be based on a stack of DHPs that is structured as shown in FIG. 6, but the invention is not limited to this. The resulting set of adjusted coefficients is obtained by performing matched hiding search 701 for each of the DHPs of the highest layer. This procedure is recursive except for the lowest layer having the following inputs:

an index of layer i a current DHP of the layer i a stack of DHPs constructed for higher layers that represent a chain of ancestor DHPs relative to the current DHP (see FIG. 6). When the matched hiding search is performed for the DHPs of the highest layer the stack of DHPs is empty.

the target values associated with each of DHPs. These target values are in fact the values to be hidden and define the result that is to be provided by the check function applied to the values selected by the respective DHP.

Step 702 performs a check if the lowest layer is being processed or not. Assuming all the layers are numbered from zero starting from the lowest one and the input layer has index i, block 702 compares i to zero.

If it is not the lowest layer that is processed (i is not equal to zero), a search of the best DHP chain is continued (or started in case i is equal to the index of the highest layer). For the both start and continuation search cases the following steps are performed: best cost initialization 703, saving state of search 704, DHP scan 705, and coefficients update.

Initialization of the best cost 703 should guarantee that best cost check 715 returns the value true unless best hiding cost is not redefined. For example, if best hiding cost could be stored in a variable, initialization 703 could assign the highest possible value of this variable that should be greater than any hiding cost calculated during step 714.

Another possible way of initialization 703 is to introduce a special initialization flag equal to false before the check 715 for the first time, and switching it to true after the check 715 is performed. In this case, check 715 should always true if initialization flag is false.

Saving the state of the search 704 is necessary for maintaining DHP scan 705 consistency, i.e. every independent iteration of the scan 705 should start with the same state of coefficients and stack of DHPs. Both coefficients of the subset corresponding to the current DHP and stack of DHPs could be stored to temporary arrays during step 704 and could be restored from these temporary arrays during restoration step 706. Alternatively, restoration step 706 could be performed before starting next iteration of 705, i.e. after the completion of 717 or when 715 evaluates to false. However, the placement of 706 should not affect the obtained result since it provides the same initial state of coefficients and the same initial state of a stack of DHPs for all the iterations of 705.

A DHP is a child one to a current DHP, if the subset of coefficients for child DHP is included into a subset of coefficients corresponding to a current DHP. Step 705 scans all the DHPs of layer i−1 that are child ones to current DHP in order to select such a child DHP that would provide the value of the target check function not only for itself, but for the chain of ancestor DHPs as well.

When the candidate child DHP is selected, the other child DHPs should be adjusted first because adjustments of the coefficients of any of child DHP affects the adjustments that should be performed for the selected DHP. Step 707 iterates over all child DHPs except the selected one, and performs matched hiding search for each of them. However, not the current stack of DHPs is passed to the matched hiding search 709 during iteration 707, but the new one constructed at step 708. This newly constructed set contains a child DHP currently iterated at step 707, and hence all the DHPs iterated by 707 provide the correct check function values for themselves and their successor DHPs, but not for the ancestor DHPs.

The target check function values of ancestor DHPs should be provided only by the child DHPs selected at iteration step 705. Therefore, when step 707 is complete, the input stack of DHPs is updated with the selected child DHP 711 and the current input DHP 712, which is a parent to the selected child DHP.

When all the coefficient adjustments are complete, it is possible to calculate cost of hiding 714 for the given stack of DHPs. By comparing 715 of this cost with the best one, the best coefficient adjustment variant may be selected. This selection may include saving coefficient adjustments 716 to a temporary array and redefining the best cost 717 with the current one calculated at step 714. The best adjustments of coefficients are restored from this temporary array during the step 718, when all the variants for the current DHP are processed by iteration at step 705. The further actions 721 depend on the current layer i. If i is equal to the highest layer index, matched hiding search is complete and coefficients of the DHP are adjusted. Otherwise, recursive call is complete and other step following 709 should be performed accordingly.

For the case of the lowest layer (i is zero), matched hiding search 701 should perform subset adjustment 720 according to the input stack of DHPs. Coefficients selected for subset adjustment at step 719 should belong to a subset corresponding to the DHP of the highest layer of the input stack of DHPs.

FIG. 8 shows the process of coefficients adjustment 801 for the given subset of coefficients, a given stack of DHPs that contains MDHPs and a given stack of target values that should be provided by each if DHPs belonging to the stack of DHPs. The counter of recursive calls is initialized to zero at step 802. However, this step 802 should be skipped if subset adjustment 801 is recursively called. Afterwards, a subset check 803 is performed that verifies whether the results of check functions are accordingly equal to the values from the stack of target values. This check 803 consist in calculating check function value for each of the DHPs 804, and comparing these values with the target ones 805.

If this equality stands for all the DHPs of the input stack of DHPs, subset adjustment is complete. Immediate exit 813 should be performed, even if subset adjustment 801 was recursively called from the step 815.

Otherwise, the search of coefficient adjustment continues. It could be noticed that since the DHPs in the stack are decoupled the target values of check functions could be achieved by adjusting maximum of M coefficients. However, depending on the situation, the number of required adjustments could be lesser than M.

Coefficients adjustment starts with storing the values of coefficients in a temporary array 806, so any adjustments during iterative search 807 could be restored to initial state. This iterative search 807 is performed for all the coefficients of the input subset except those already modified at previous recursive calls. For the selected coefficient adjustment 808 is performed. Specifically this adjustment may consist in adding some constant value (positive or negative) or altering values of bits of the coefficient. Besides, at step 808 the cost of adjustment is calculated. Then the set of coefficients is rolled back to the initial state 809 and next coefficient is selected.

When all the coefficients are iterated, the counter of recursion loops is incremented at step 811. The special check 810 on this counter is performed in order to detect possible errors. Step 810 may also be omitted as it is only optional. Specifically, if the recursion counter exceeds the number of DHPs in the stack M, it means that subset check 803 did not succeed for M adjusted coefficients. This situation is possible only in the case when DHPs of the stack are not decoupled. When it happens, the check 810 does not succeed and error 812 should be handled. Normally, the check 810 should evaluate to true in all the cases. Besides incrementing recursion counter 811, input coefficients are adjusted according to the best cost selected from the ones calculated at step 808. The coefficient adjustment providing the best cost value is performed at step 814, the adjusted coefficients is excluded from the check 807 performed during next iterations and finally subset adjustment is recursively called (step 815).

Evidently, the above-described subset adjustment 801 modifies M or lesser number of coefficients with minimal adjustment cost. The adjustment procedure 801 could be suboptimal but should always provide a valid result for valid input arguments. It could be noticed that this procedure could be also implemented in a form of a loop, since recursive call 815 is the last step of this procedure.

Figure 9:
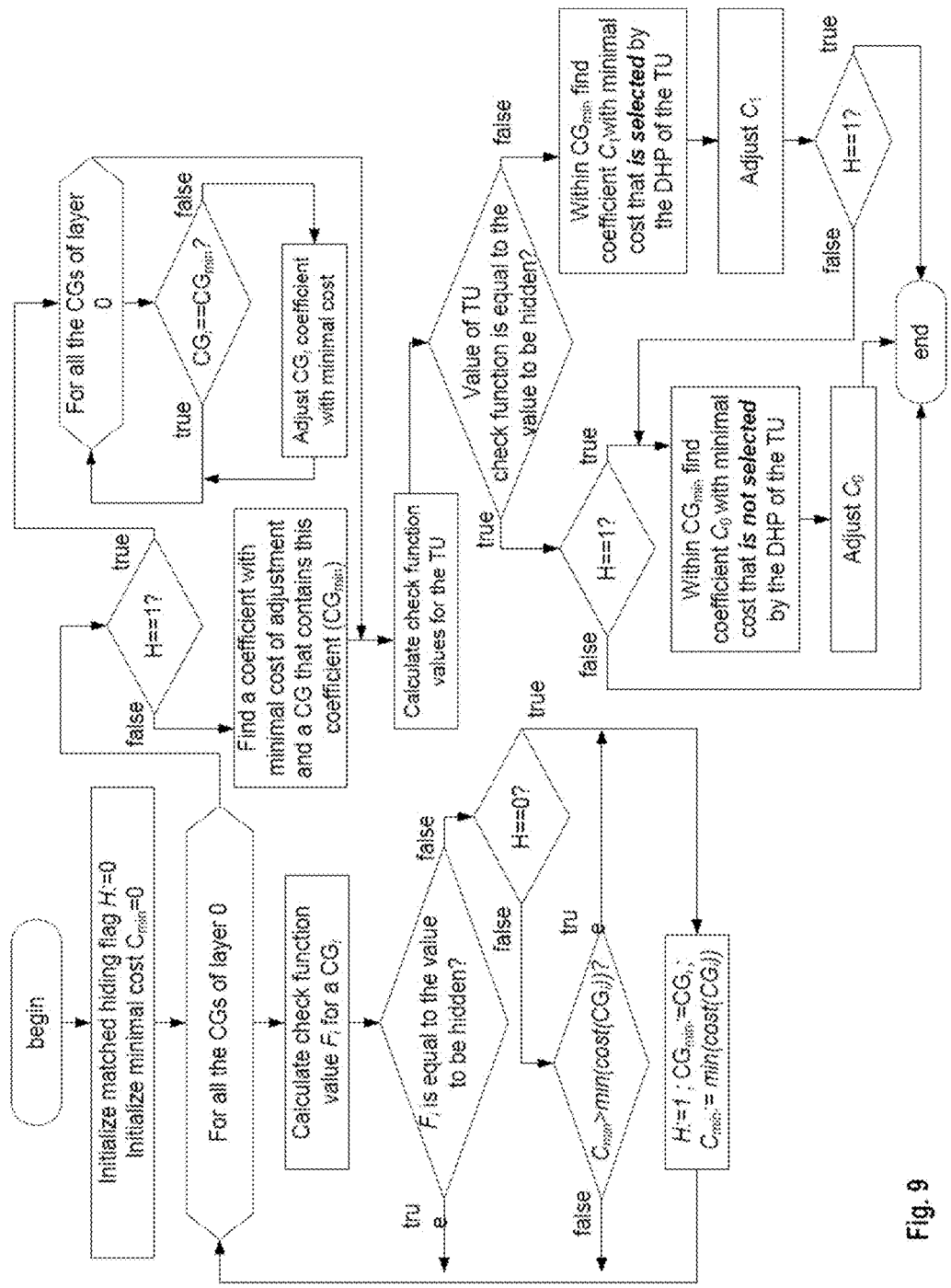
FIG. 9 shows a flowchart of a simplified procedure for coefficient adjustment on the encoder side for data hiding patterns of two layers according to an exemplary embodiment of the invention.

For the special case of data hiding within two layers a simpler scheme 901 could be considered, as illustrated in FIG. 9. In this example, it is assumed for exemplary purposes only that parent DHPs correspond to TUs and child DHPs correspond to CGs. The first step of the procedure is initialization of best cost and hiding flag is performed. The ways to initialize best cost are the same as for step 703 of generalized scheme. Initial value of matched hiding flag is zero. When an iteration that loops is finished, a CG with minimal adjustment cost is determined. The check step controls the further steps of the scheme depending whether the need of coefficients adjustment exists for the layer 0. If this need is detected for at least one of the CGs, matched hiding flag is turned to one.

The actions following depend on whether layer 0 needs adjustments. If so, all the needed CGs except the CG with the minimal cost are adjusted. Otherwise, the coefficient with minimum adjustment cost is searched within all the CGs.

Next is to calculate check function value at layer 1 (for the TU). This value is checked by comparing with the target value. If for the TU adjustment should be performed, the coefficient with the minimal cost that is selected by DHP of the TU is adjusted. Depending on the matched hiding flag value, second coefficient should be adjusted. This adjustment is necessary to match adjustments for layer 1 with adjustments for layer 0.

If TU check function evaluation succeeds and matched hiding flag is not zero it is possible to adjust a single coefficient not belonging to a DHP of the TU.

If TU check function evaluation succeeds and matched hiding flag is 0, there is no need for adjustment and the procedure is terminated.

In the description above, reference to the hiding costs resulting from modification of the input data set is made. In the video or image coding context, the hiding costs might be for example determined by some cost function, which estimates or determines the reduction in image quality that results from a given modification of the input data set. Such reduction of image quality may be for example estimated using cost functions that determine or approximate the rate distortion resulting from the modification of the input data set. Notably, as the calculation of rate distortion may be expensive in terms of resource usage, it may be preferable to select cost functions that allow a less computationally intensive estimation of the costs, and which may only provide an estimate of the quality reduction.

The decoding process of the hidden data could be implemented follows. The decoding apparatus obtain the respective encoded coding units from a coded stream of data. As the stack of decoupled data hiding patterns used by the encoding apparatus may be static, configurable or derivable from the structure of the encoded coding unit (as discussed above), the decoding apparatus is aware of the data hiding patterns and the input data sets forming the basis of the data hiding operations at the encoding apparatus. Accordingly, the decoding apparatus can simply calculate the check function of the respective data hiding patterns using the appropriate input data sets. These output values of a check function(s) represent the restored hidden data.

Figure 10:
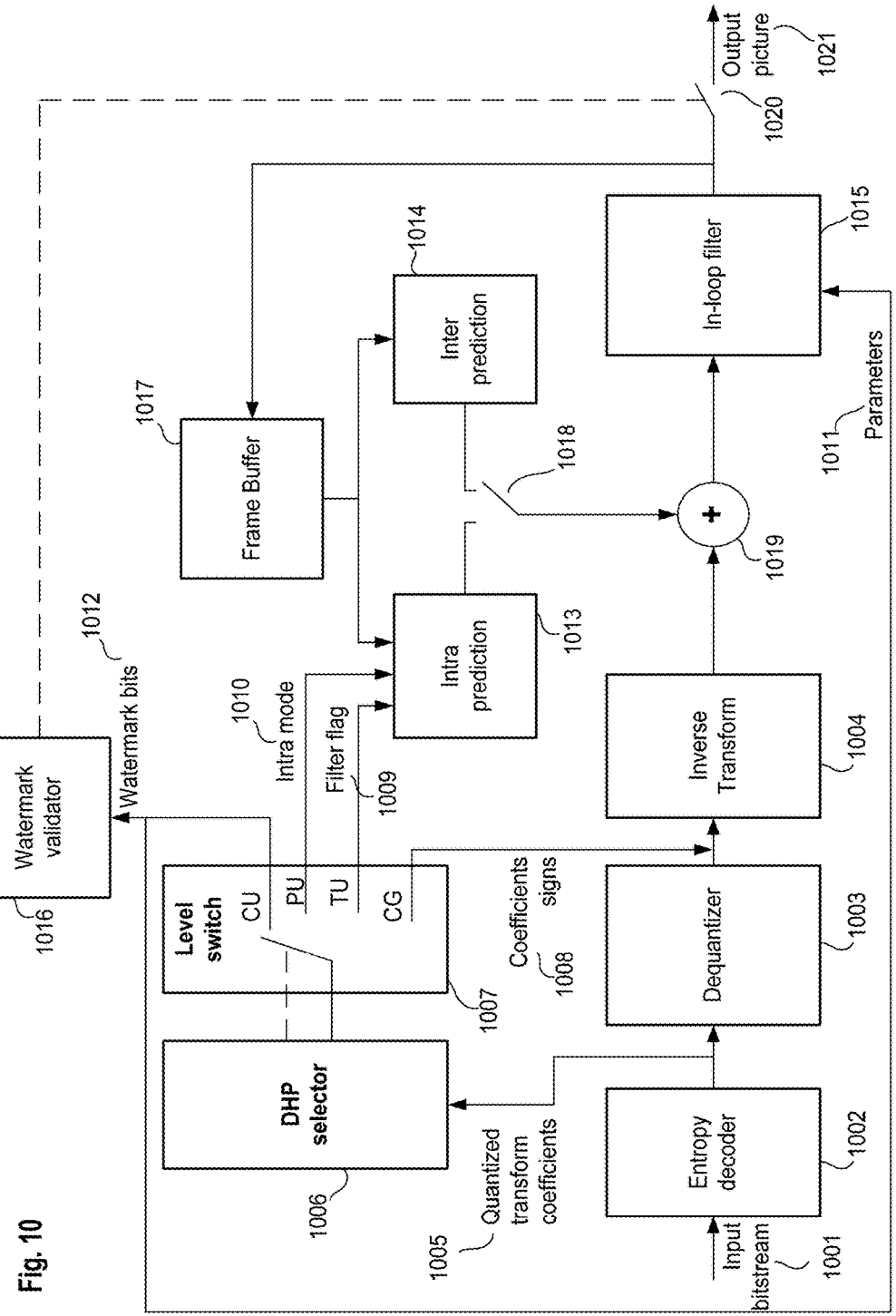
FIG. 10 shows a flowchart of a process for decoding video stream according to an embodiment of the invention.

As regards the selection of the check functions for the data hiding operations, the only requirement for a check function is that it should have a single output value (binary or non-binary) for the set of input target values. The most common type of a check function is a parity check function that derives a binary output value by checking whether the sum of input target values is even or odd. In the following list some other valid examples of check functions are given:
equality to zero of the remainder from the division of some distance function (e.g., a sum function) result by $x \in \mathbb{N}$,
parity of the number of zero (or non-zero) values
comparison of a value of some statistical characteristic (mean, deviation etc.) with a threshold An output value of a check function could be defined as non-binary as well. For instance,
remainder from division of some distance function (e.g., a sum function) value by $x \in \mathbb{N}$, $x>1$. In this case a check function output value is limited to the range $[0, \ldots, x-1]$
quantized value of some statistical characteristic (mean, deviation etc.)
function of number of elements inside the given set of values that satisfy some criteria A more detailed process of decoding a video stream according to an exemplary embodiment of the invention is shown in FIG. 10. This decoding process is suitable for decoding an encoded video stream, which has been encoded using the method described in connection with FIGS. 7 and 8 above. The encoded input bitstream 1001 is processed by an entropy decoder 1002. Some of the decoded values correspond to the absolute values of quantized transform coefficients 1005. These values are further processed by a de-quantizer. The result of this process are absolute values of coefficients that are suitable for inverse transform process 1004 after the correct signs are assigned to them.

The signs of the values may be for example explicitly signaled in the encoded input bitstream 1001 or may be comprised as hidden data therein. In the first case, the derivation of the signs could be performed explicitly by entropy decoder 1002, and in the second case implicitly by applying appropriate DHP to the corresponding set of quantized transform coefficients. DHP selector 1006 performs DHP selection depending on the available quantized transform coefficients 1005 provided by an entropy decoder 1002. When coefficients are available only for a coefficient group (CG), DHP selector 1006 extracts the sign value (or values) for the CG and provides these signs 1008 to get the correct values of the coefficients for the inverse transform 1004.

When quantized transform coefficients are available for a larger structural element that could comprise more than one CG, DHP selector 1006 applies all the DHPs that could be applied to the given (sub)set of coefficients. Depending on what DHP is selected, output values are dispatched by the level switch 1007. As it was described for coefficient signs 1008, output of 1007 may provide a part of the decoded data. In that case, the rest of the data should be decoded otherwise. One of the most obvious ways is decode this part explicitly and to restore it using entropy decoder 1002.

As it is shown in FIG. 10, the possible output data for the DHP selector 1007 could be one or more of the following:
coefficient signs 1008,
flag for filtering reference samples 1009 (its usage is further illustrated by FIG. 12),
mode of intra-prediction 1010,
loop filter parameters 1011,
watermark bits 1012.

However, FIG. 10 gives only several examples of the data that could be possibly hidden within quantized transform coefficients. Possible types of hidden data are not limited to the list given above.

After transform coefficients are inversely transformed, residual signal is restored, which is further added with prediction signal 1019. Prediction signal is generated using intra prediction 1013 or inter prediction 1014 mechanisms depending on the selected prediction mode. This selection could be implemented in a form of a switch 1018. Both inter- and intra prediction uses previously decoded pixels, which are stored in the frame buffer 1017. However, intra-prediction mechanism could use pixels that were not modified by a loop filter 1015.

Besides video coding application the proposed embodiment of the invention may also solve additional tasks, such as watermarking. DHP selector 1006 may restore hidden watermark bits 1012, and depending on the result returned by a watermark validator 1016 for these bits, output frames are prevented from the output, as exemplified by switch 1020. If validation succeeds, switch 1020 is "closed", and output picture 1021 is output by the decoder. Otherwise, switch 1020 is "opened", and watermark validator 1016 could signal watermark mismatch.

Figure 11:
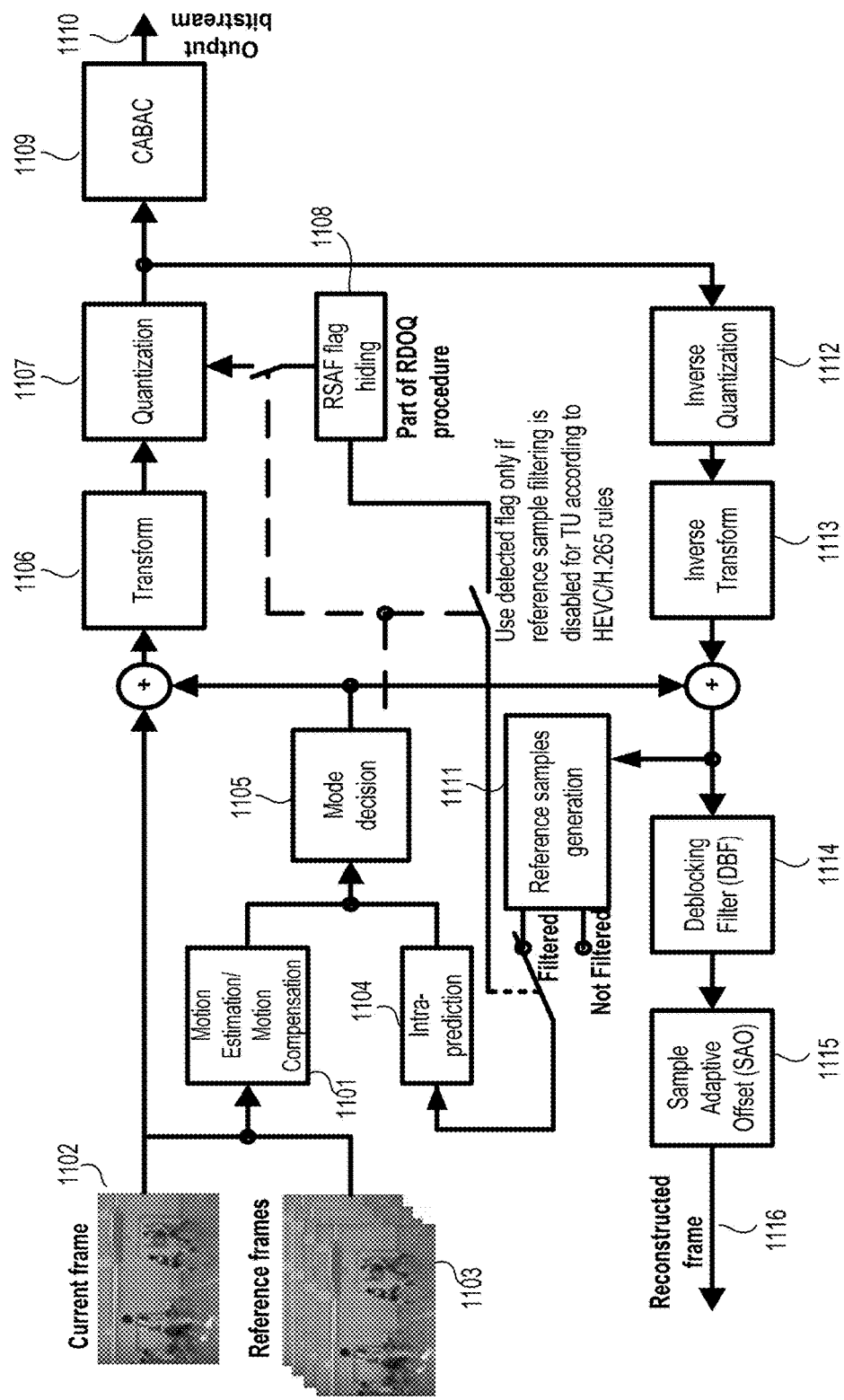
FIG. 11 shows an encoder and decoder structure of an exemplary embodiment of the invention.

FIG. 11 shows an exemplary structure of a video encoding apparatus according to an embodiment of the invention. The encoding apparatus also comprises blocks for decoding (1112-1115), which could also be provided separately in a decoding apparatus, which further includes an entropy decoder 1002. The apparatus of FIG. 11 can be for example implemented on an application-specific or general purpose computing device (see FIGS. 14 and 15). The encoding apparatus receives a video signal, including individual frames/slices 1102 which are to be encoded, and produces an encoded bitstream 1110. A decoding apparatus as shown in FIG. 15 could receive the encoded bitstream 1110 and outputs a decoded video frames/slices for each frame/slice of the video signal.

The encoding apparatus includes a motion estimation/ motion compensation block 1101, a mode decision block 1105, transform block 1106, quantizer 1107, and entropy encoder (CABAC) 1109. The mode decision block 1105 may determine the appropriate coding mode for the video source. The mode decision block 1105 may for example decide, whether the subject frame/slice is a I, P, or B frame/slice, and/or whether particular coding units within the frame/slice are inter or intra coded.

The transform block 1106 performs a transform upon the spatial domain data. Such transform of the transform block 1106 may be a block-based transform to convert spatial domain data to spectral components. For example, a discrete cosine transform (DCT) may be used for transformation. Other transformations, such as a discrete sine transform or others may also be used. The block-based transform is performed on a coding unit depending on the size of the coding units. The block-based transform of a block of pixel data results in a set of transform coefficients as discussed above. The transform coefficients are quantized by the quantizer 1107. The quantized coefficients and associated side information are then encoded by the entropy encoder (CABAC) 1109. A block or matrix of quantized transform coefficients may be referred to as a transform unit (TU). In some cases, the TU may be non-square, e.g. a non-square quadrature transform (NSQT).

Intra-coded frames/slices (i.e. type I) are encoded without reference to other frames/slices 1103, and thus do not employ temporal prediction. Intra-coded frames (see block 1104) rely upon spatial prediction within the frame/slice. When encoding a particular block of pixels in the block may be compared to the data of nearby pixels within blocks already encoded for that frame/slice. Using a prediction algorithm, the source data of the block may be converted to residual data. The transform block 1106 then encodes the residual data.

The intra-prediction is performed on reference samples that are produced by reference sample generation block 1111. Block 1111 may output filtered or unfiltered reference samples for intra-prediction, and the choice which of them is used is signaled by means of a filtering flag. In the example of FIG. 11, it is exemplarily assumed that the reference sample filter flags are added as hidden data into the output bitstream 1110. The RSAF flag hiding block 1108 performs a hiding operation as discussed in connection with FIGS. 7 and 8 above, and may optionally also hide further side information, such as some or all of the signs of the transform coefficients obtained from transform block 1106 (not shown in FIG. 11).

To support motion prediction/compensation to take advantage of temporal prediction, the encoding apparatus has a feedback loop that includes an inverse quantizer 1112, inverse transform block 1113, de-blocking filter 1114, and optionally the sample adaptive offset block 1114. The de-blocking filter 1114 may include a de-blocking processor and a filtering processor. Elements 1112-1115 mirror the decoding process implemented by a decoding apparatus to reproduce the original frame/slice, as outlined above. A frame store (reference frames 1103) is used to store the reproduced frames. In this manner, the motion prediction is based on what will be the reconstructed frames 1116 and not on the original frames, which may differ from the reconstructed frames 1116 due to the lossy compression involved in encoding/decoding. Motion estimation/motion compensation 1101 uses the frames/slices stored in the frame store as source frames/slices for comparison to a current frame for the purpose of identifying similar blocks. The data provided by motion estimation/motion compensation 1101 may comprise, as side information, information regarding the reference frame, a motion vector, and residual pixel data that represents the differences (if any) between the reference block and the current block. The residual signal provided to motion estimation/motion compensation 1101 for further encoding. Information regarding the reference frame and/or motion vector may not be processed by the transform block 1106 and/or quantizer 1107, but instead may be supplied to the entropy encoder (CABAC) 1109 for encoding as part of the bitstream along with the quantized coefficients.

A decoding apparatus may include an entropy decoder which inverses the entropy coding of the encoder side as well as blocks 1112 to 1115 shown in FIG. 11.

Figure 12:
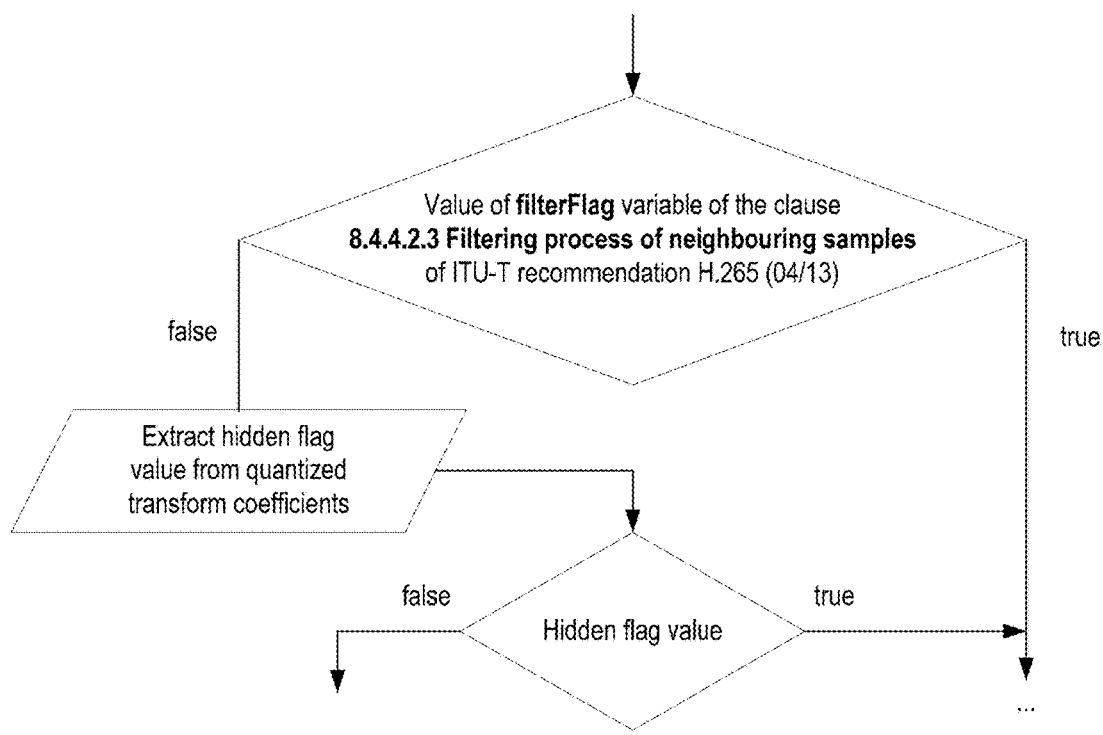
FIG. 12 shows an exemplary modification of the flowchart implicit flag signaling for reference sample filtering according to ITU T H.265/HEVC intra-prediction according to an exemplary embodiment of the invention.

Embodiments of the invention has a wide range of applications. As noted above, one example of such an application implicit flag signaling for reference sample filtering for ITU T H.265/HEVC intra-prediction could be envisioned as discussed above. However, as noted above, also other side information that form part of the data structures generated during encoding could be hidden by means of embodiments of the invention. According to ITU T H.265/HEVC, the decision on whether to apply a low-pass filter to reference samples is taken according to the selected prediction mode and the size of the block being predicted. This decision could be overridden by a flag that could be signaled implicitly within quantized transform coefficients using the proposed embodiment of the invention. This modification is illustrated in FIG. 12.

Figure 13A:
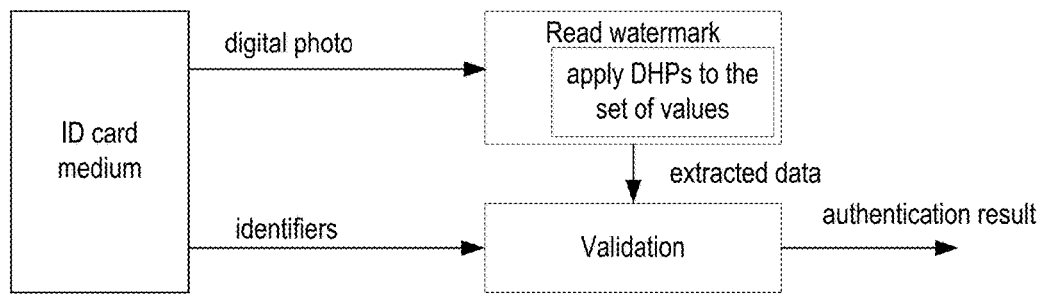
FIG. 13a and FIG. 13b and FIG. 13c are a show exemplary use cases of the concepts of the invention according to different further embodiments.
Figure 13B:
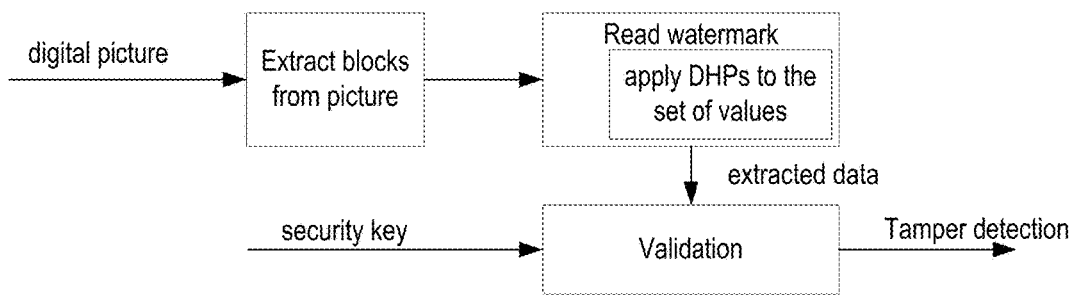
Figure 13C:
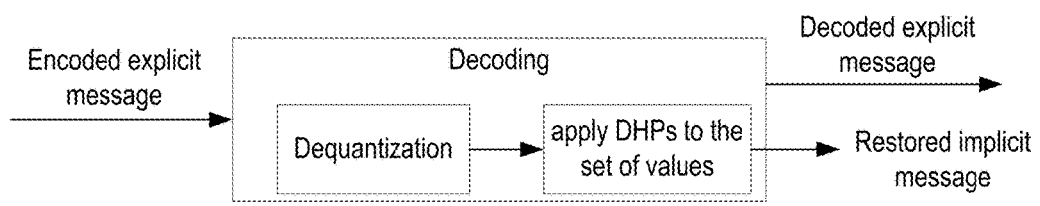

In addition to media compression, a large set of use-cases for this invention could be found in watermarking applications. FIG. 13a and FIG. 13b and FIG. 13c represents some of these embodiments. The use-case shown in FIG. 13a represents the authentication procedure that consists in validating identifiers of an ID card using hidden data that could be extracted by applying DHPs either to pixels or to the quantized transform coefficients of a digital photo stored on this card. Validation could be performed in different ways, e.g., by calculating a checksum value and comparing it with the extracted data. Authentication fails if comparison mismatch occurs. This mismatch indicates that either a digital photo or identifiers have been changed without permission. If comparison succeeds, validation should result in positive authentication.

FIG. 13b gives an example of tamper detection application. For that case it is assumed that digital picture has been prepared to have a key data hidden in its blocks, e.g., in pixel values or transform coefficients. A watermark reading operation retrieves this hidden key from the blocks of the picture using DHPs, which is further validated using security key. The validation procedure is the same as for the case presented in FIG. 8a, so a mismatch results in detecting particular picture blocks that have been tampered.

Another use-case (FIG. 13c) assumes it is required to transmit an implicit message within an explicit one in such a way that it is hard to detect the presence of this implicit message. In the example of this use-case shown in FIG. 8c the implicit message is restored by applying DHPs to the quantized values during the decoding of an explicit message.

Figure 14:
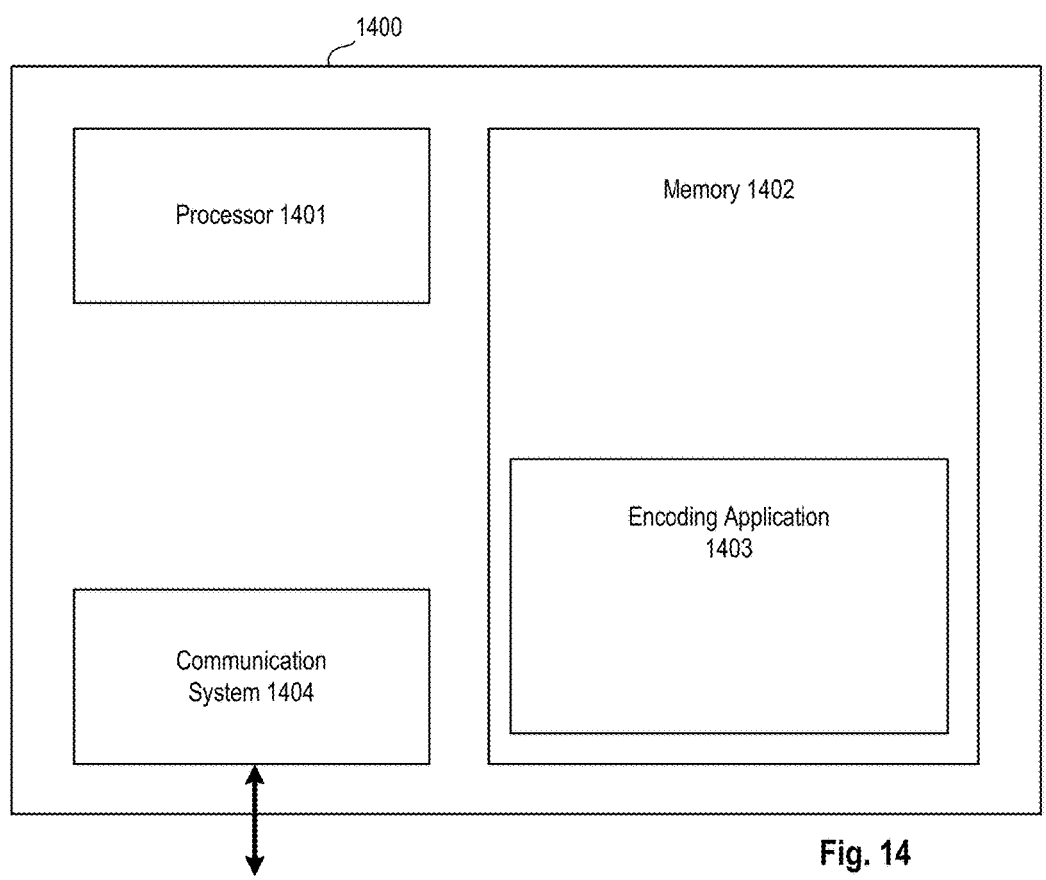
FIG. 14 shows an exemplary encoding apparatus of an embodiment of the invention.
Figure 15:
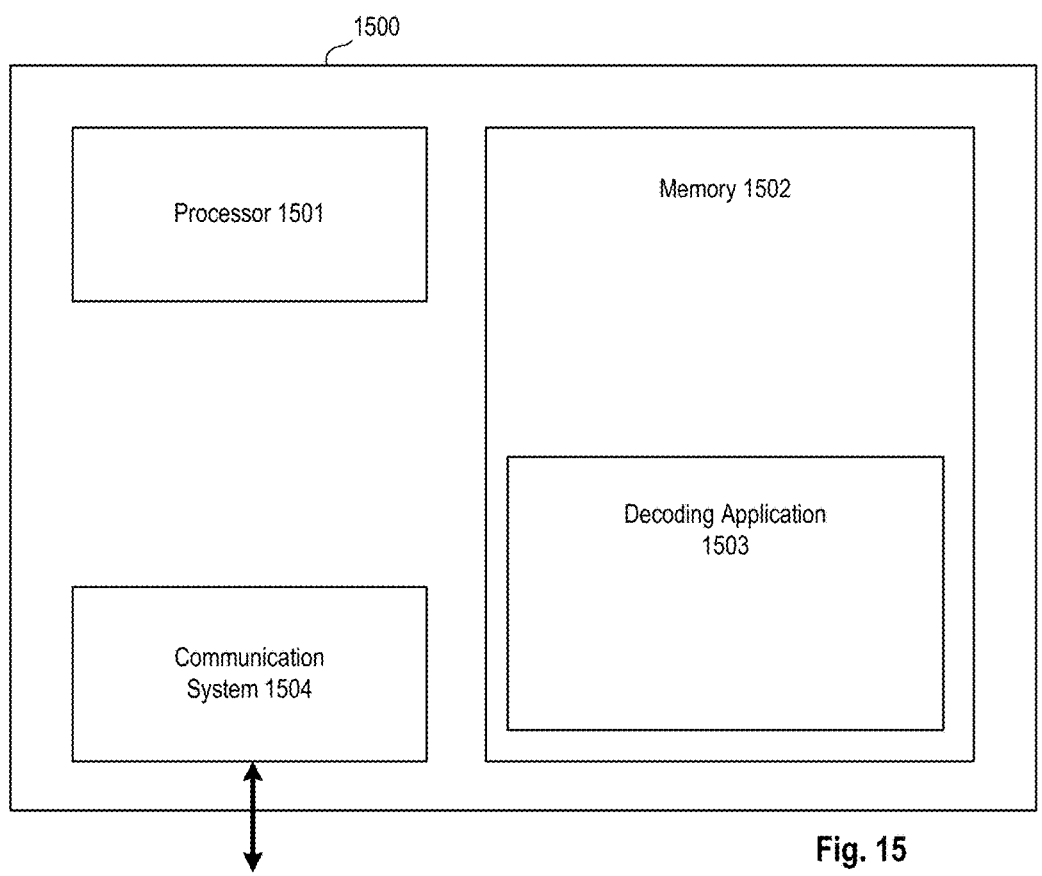
FIG. 15 shows an exemplary decoding apparatus of an embodiment of the invention.

FIG. 14 shows a simplified block diagram of an example embodiment of an encoder 1400. The encoder 1400 includes a processor 1401, memory 1402, and an encoding application 1403. The encoding application 1403 may include a computer program or application stored in memory 1402 and containing instructions for configuring the processor 1401 to perform operations such as those described herein. For example, the encoding application 1403 may encode and output bitstreams encoded in accordance with an encoding process according to the various embodiments described herein, e.g. in connection with FIGS. 7 and 8 above. It will be understood that the encoding application 1403 may be stored in on a computer readable medium. The output bitstream may be for example transmitted via a communication system 1404 or stored on a computer readable medium.

Reference is now also made to FIG. 15, which shows a simplified block diagram of an example embodiment of a decoder 1500. The decoder 1500 includes a processor 1501, a memory 1502, and a decoding application 1503. The decoding application 1503 may include a computer program or application stored in memory 1501 and containing instructions for configuring the processor 1501 to perform decoding an input bitstream according to one of the various embodiments herein, e.g. as outlined in connection with FIG. 10 above. It will be understood that the decoding application 1503 may be stored in on a computer readable medium. The input bitstream may be for example received via a communication system 1504 or may be read from a computer readable medium.

Although some aspects have been described in the context of a method, it is clear that these aspects also represent a description of the corresponding apparatus suitably adapted to perform such method. In such apparatus a (functional or tangible) block may correspond to one or more method step or a feature of a method step. Analogously, aspects described in the context of a corresponding block or item or feature of a corresponding apparatus may also correspond to individual method steps of a corresponding method.

Furthermore, the methods described herein may also be executed by (or using) a hardware apparatus, like processor(s), microprocessor(s), a programmable computer or an electronic circuit. Some one or more of the most important method steps may be executed by such an apparatus. Where an apparatus has been described herein in terms of functional blocks, it should be further understood that those elements of the apparatus may be fully or partly implemented in hardware elements/circuitry. Individual hardware, like processor(s) or microprocessor(s), etc., may be used to implement the functionality of one or more elements of the apparatus.

In addition, where information or data is to be stored in the process of implementing a method step of functional element of an apparatus in hardware, the apparatus may comprise memory or storage medium, which may be communicatably coupled to one or more hardware elements/circuitry of the apparatus.

It is also contemplated implementing the aspects of the invention in hardware or in software or a combination thereof. This may be using a digital storage medium, for example a floppy disk, a digital versatile disc (DVD), a Blu-Ray, a compact disc (CD), a read-only memory (ROM), a programmable read-only memory (PROM), an erasable programmable read-only memory (EPROM), an Electrically Erasable Programmable Read-Only Memory (EEPROM) or a FLASH memory, having electronically readable control signals or instructions stored thereon, which cooperate (or are capable of cooperating) with a programmable computer system such that the respective method is performed. A data carrier may be provided which has electronically readable control signals or instructions, which are capable of cooperating with a programmable computer system, such that the method described herein is performed.

It is also contemplated implementing the aspects of the invention in the form of a computer program product with a program code, the program code being operative for performing the method when the computer program product runs on a computer. The program code may be stored on a machine readable carrier.

The above described is merely illustrative, and it is understood that modifications and variations of the arrangements and the details described herein will be apparent to others skilled in the art. It is the intent, therefore, to be limited only by the scope of the impending claims and not by the specific details presented by way of description and explanation above.

What is claimed is:

1. A method for hiding values of a hierarchically layered coding unit in other values included in the coding unit, the method comprising:

providing a layered stack of data hiding patterns for hiding the values of the coding unit in different layers of the coding unit, wherein each of the data hiding patterns has an associated check function for hiding one or more of the values of the coding unit at one of the layers of the coding unit;

(i) calculating the check function of a respective one of the data hiding patterns based on values selected by the respective data hiding pattern from the other values of the coding unit;

(ii) determining whether a result of the check function corresponds to a value of the coding unit that is to be hidden by the respective data hiding pattern; and (iii) when the result of the check function does not correspond to a value of the coding unit that is to be hidden by the data hiding pattern, modifying at least one of the values selected by the respective data hiding pattern from the other values of the coding unit so that the result of the check function in step (ii) corresponds to the value of said coding unit that is to be hidden by the respective data hiding pattern;

wherein the hierarchically layered coding encoded coding unit comprises the other values of the coding unit as modified in step (iii) for all data hiding patterns.

2. The method according to claim 1, wherein the layered stack of data hiding patterns defines decoupled data hiding patterns.

3. The method according to claim 1, wherein each layer of the layered stack of data hiding patterns is associated with one or more of the data hiding patterns.

4. The method according to claim 1, wherein the data hiding patterns consist of at least one of: one or more decimation-based data hiding patterns, one or more regular data hiding patterns, and one or more pseudo-random data hiding patterns.

5. The method according to claim 1, wherein the method further comprises for each data hiding patterns:

when an algorithm used to modify the at least one of the values selected by the respective data hiding pattern from the other values of the coding unit in step (iii) and when the result of the check function in step (ii) still does not corresponds to the value of the coding unit that is to be hidden by the respective data hiding pattern, repeating steps (i) to (iii) until the result of the check function in step (ii) corresponds to the value of the coding unit that is to be hidden by the respective data hiding pattern.

6. The method according to claim 1, wherein when performing steps (i) to (iii) using a first data hiding pattern and a second data hiding pattern, respectively, when the one or more other values of the coding unit that have been selected by the first data hiding pattern and have been modified in step (iii), are not modified in step (iii) when performing the second data hiding pattern.

7. The method according to claim 1, wherein the at least one of the values modified in step (iii) for one of the data hiding patterns are considered instead of the original values when performing steps (i) to (iii) for another data hiding pattern.

8. A method of reconstructing hidden values from an encoded coding unit, the method comprising:

providing a layered stack of data hiding patterns that has been used by an encoder for hiding the values in the encoded coding unit, wherein each of the data hiding patterns has an associated check function; and for each of the data hiding patterns, calculating a result of the check function of a respective one of the data hiding patterns based on values selected by the respective data hiding pattern from the other values of the unencoded coding unit, wherein the result of the check function corresponds to one of the reconstructed hidden values.

9. The method according to claim 1, wherein the values included in the coding unit are values of a lowest hierarchical layer of the coding unit, based on which check functions of the data hiding patterns are calculated.

10. The method according to claim 9, wherein the results of the check functions of the data hiding patterns associated with a layer other than the lowest hierarchical layer of the coding unit are calculated using values selected by a respective one of the data hiding pattern from a respective subset of the values of the lowest hierarchical layer of the coding unit.

11. The method according to claim 10, wherein a size of a respective one of the data hiding pattern is determined on the basis of a size of a subset from which the result of the check function of the respective data hiding pattern is calculated.

12. The method according to claim 10, wherein a respective subset in a layer other than the lowest hierarchical layer comprises the values of the lowest hierarchical layer of the coding unit that hierarchically belong to an organizational data unit of the respective layer.

13. The method according to claim 12, wherein a number and/or size of data hiding patterns applicable to a respective organizational data unit of the respective layer are determined on the basis of the size of a subset of values belonging to the respective organizational data unit of the respective layer from which the result of the check function is calculated.

14. The method according to claim 10, wherein a size of a respective one of the data hiding patterns is equal to or a divisor of the size of the subset from which the results of the check function of the respective data hiding pattern is calculated.

15. The method according to claim 1, wherein the values of the coding unit represent a block of pixels of an image, and the coding unit includes one or more predication units, one or more transform units, and one or more coefficient groups, wherein the data hiding patterns are associated with layers of the coding unit corresponding to the prediction units, the transform units and the coding unit, respectively, and each of the data hiding patterns hides one or more values of the associated layer of the coding unit.

16. The method according to claim 15, wherein the data hiding patterns are associated with layers of the coding unit corresponding to the coefficient groups, the prediction units, the transform units, and the coding unit, respectively, wherein the coefficient groups are part of a lowest layer of the coding unit.

17. The method according to claim 1, where the check functions of the data hiding patterns are calculated based on values of the coefficient groups.

18. The method according to claim 15, wherein the data hiding patterns comprise one or more data hiding patterns for hiding a reference sample filtering flag for intra prediction for of the transform units of the coding unit.

19. The method according to claim 15, wherein the data hiding patterns comprise one or more data hiding patterns for hiding at least one of a prediction mode index and a prediction unit size of the prediction units.

20. The method according to claim 15, wherein the data hiding patterns comprise at least one data hiding pattern for embedding a watermark in the coding unit.

21. The method according to claim 15, wherein the data hiding patterns comprise at least one data hiding pattern for hiding sign bits of coefficients of the coefficient groups.

22. The method according to claim 1, wherein the values of the coding unit represent one of a block of image data, a block of audio data, and a block of a document to be encoded.

23. The method according to claim 1, wherein one of the hidden values allows confirming authenticity of the values included in the coding unit.

24. An encoding apparatus for hiding values of a hierarchically layered coding unit in other values included in the coding unit, wherein the encoding apparatus is provided with a layered stack of data hiding patterns for hiding the values of the coding unit in different layers of the coding unit, wherein each of the data hiding patterns has an associated check function for hiding one or more of the values of the coding unit in one of the layers of the coding unit, the encoding apparatus comprising a processor and a non-transitory computer-readable storage medium including computer-executable instructions executed by the processor to perform, on the apparatus, operations comprising:
- (i) calculating the check function of a respective one of the data hiding patterns based on values selected by the respective data hiding pattern from said other values of the coding unit;
- (ii) determining whether a result of the check function corresponds to a value of the coding unit that is to be hidden by the respective data hiding pattern; and
- (iii) when the result of the check function does not correspond to a value of the coding unit that is to be hidden by the data hiding pattern, modifying at least one of the values selected by the respective data hiding pattern from the other values of the coding unit so that the result of the check function in step (ii) corresponds to the value of the coding unit that is to be hidden by the respective data hiding pattern; and outputting an encoded coding unit, the encoded coding unit comprising the other values of the coding unit as modified in step (iii) for all data hiding patterns.

25. A decoding apparatus for reconstructing hidden values from an encoded coding unit, the wherein the decoding apparatus is provided with a layered stack of data hiding patterns that has been used by an encoder for hiding said values in the encoded coding unit, wherein each of the data hiding patterns has an associated check; and wherein the decoding apparatus comprises:
- a processor and a non-transitory computer-readable storage medium including computer-executable instructions executed by the processor to perform, on the apparatus, operations comprising:
- calculating, for each of the data hiding patterns, results of the check functions of a respective one of said data hiding patterns based on values selected by the respective data hiding pattern from the other values of the encoded coding unit, wherein the result of the check function corresponds to one of the reconstructed hidden values; and
- outputting the decoded coding unit comprising, as part of decoded data, the reconstructed hidden values.

26. The decoding apparatus according to claim 25, wherein the values selected by the respective data hiding pattern from the encoded coding unit are values of a lowest hierarchical layer of the coding unit.

27. The decoding apparatus according to claim 26, wherein the operations further comprise:
- calculating the check functions of the data hiding patterns associated with a layer other than the lowest hierarchical layer of the encoded coding unit using values selected by a respective one of the data hiding patterns from a respective subset of the values of the lowest hierarchical layer of the coding unit.

28. The decoding apparatus according to claim 27, wherein the operations further comprise:
- determining the size of one of the data hiding patterns based on a size of a subset from which the check function of the respective data hiding pattern is calculated.

29. The decoding apparatus according to claim 27, wherein a respective subset in a layer other than the lowest hierarchical layer comprises the values of the lowest hierarchical layer of the coding unit that hierarchically belong to an organizational data unit of the respective layer.

30. The decoding apparatus according to claim 29, wherein the operations further comprise:
- determining a number and/or size of data hiding patterns applicable to a respective organizational data unit of the respective layer based on the size of the subset of values belonging to the respective organizational data unit of the respective layer from which the check function is calculated.

\* \* \* \* \*